United States Patent
Takagi et al.

(10) Patent No.: US 10,671,230 B2
(45) Date of Patent: Jun. 2, 2020

(54) INPUT DEVICE AND CONTROL METHOD THEREOF

(71) Applicant: ALPS ALPINE CO., LTD., Tokyo (JP)

(72) Inventors: Masafumi Takagi, Miyagi (JP); Naoyuki Hatano, Miyagi (JP); Kazuhito Oshita, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 16/535,368

(22) Filed: Aug. 8, 2019

(65) Prior Publication Data

US 2019/0361570 A1 Nov. 28, 2019

Related U.S. Application Data

(63) Continuation of application No. PCT/JP2018/005456, filed on Feb. 16, 2018.

(30) Foreign Application Priority Data

Mar. 15, 2017 (JP) .................................. 2017-049586

(51) Int. Cl.
*G06F 3/044* (2006.01)
*G01D 5/24* (2006.01)

(52) U.S. Cl.
CPC ............. *G06F 3/0446* (2019.05); *G01D 5/24* (2013.01)

(58) Field of Classification Search
CPC .................................. G06F 3/0446; G01D 5/24
See application file for complete search history.

(56) References Cited

U.S. PATENT DOCUMENTS

| 2014/0043287 A1* | 2/2014 | Nakajima | G06F 3/0418 345/174 |
|---|---|---|---|
| 2016/0139734 A1 | 5/2016 | Nakajima et al. | |
| 2018/0032200 A1* | 2/2018 | Hong | H03K 17/962 |

FOREIGN PATENT DOCUMENTS

| JP | 2012-150747 | 8/2012 |
| JP | 2014-182471 | 9/2014 |
| JP | 2014-203205 | 10/2014 |
| JP | 2018/005456 | 2/2018 |

OTHER PUBLICATIONS

International Search Report dated Apr. 24, 2018 in PCT/JP2018/005456 filed on Feb. 16, 2018.

* cited by examiner

Primary Examiner — Michael Pervan
(74) Attorney, Agent, or Firm — IPUSA, LLC

(57) ABSTRACT

An input device for detecting a change in capacitance in accordance with proximity of an object is provided. The input device includes: a sensor unit including multiple capacitive coupling parts formed between multiple driving electrodes and multiple sensing electrodes; a capacitance detector for detecting a capacitance value of each of the capacitive coupling parts; and a two-dimensional data generating unit for generating a two-dimensional data matrix consisting of the capacitance values of the capacitive coupling parts. When a target row or a target column in the two-dimensional data matrix matches a first pattern indicating that multiple capacitive coupling parts each having a capacitance value greater than a reference value are arranged consecutively, the input device updates the reference value.

8 Claims, 23 Drawing Sheets

FIG.3A

| | X0 | X1 | X2 | X3 | X4 | X5 | X6 | X7 | X8 | X9 | X10 | X11 | X12 | X13 | X14 | X15 | X16 | X17 | X18 | X19 | X20 | X21 | X22 | X23 | X24 | X25 | X26 |
|---|---|---|---|---|---|---|---|---|---|---|---|---|---|---|---|---|---|---|---|---|---|---|---|---|---|---|---|
| Y15 | | | | | | | | | | | | | | | | | | | | | | | | | | | |
| Y14 | | | | | | | | | | | | | | | | | | | | | | | | | | | |
| Y13 | | | | | | 122 | 126 | 114 | 12 | | | | | | | | | | | | | | | | | | |
| Y12 | | | | | | | | | 110 | 120 | 125 | 121 | | | | | | | | | | | | | | | |
| Y11 | | | | 106 | | | | | | | | 20 | 16 | 116 | | | | | | | | | | | | | |
| Y10 | | | 8 | 118 | | | | | | | | | | | | | | | | 24 | | | | | | | |
| Y9 | | | 24 | 126 | | | | | | | | | | 44 | 28 | 32 | 28 | 24 | 4 | | | | | | | | |
| Y8 | | | 20 | 127 | | | | | | | | 20 | 16 | 117 | 111 | 116 | 115 | 120 | 115 | 111 | 156 | 117 | | | | | |
| Y7 | | | 24 | 126 | | | | | | | | | | | | | | | | 116 | 90 | 88 | 109 | | | | |
| Y6 | | | 16 | 127 | | | | | | | | | | | | | | | | 35 | 92 | 20 | 118 | 20 | | | |
| Y5 | | | 24 | 131 | | | | | | | | | | | | | | | | | | | 125 | 32 | | | |
| Y4 | | | 8 | 130 | 4 | | | | | | | | | | | | | | | | | | 124 | 32 | | | |
| Y3 | | | | 117 | 40 | | | | | | | | | | | | | | | | | | 125 | 32 | | | |
| Y2 | | | | | 122 | 112 | 16 | | | | | | | | | | | 8 | 117 | 115 | 104 | | 126 | 32 | | | |
| Y1 | | | | | | | 115 | 122 | 129 | 130 | 136 | 130 | 128 | 123 | 119 | 114 | 105 | | | | | 113 | 127 | 28 | | | |
| Y0 | | | | | | | | | | | | | | | | | | | | | | | 127 | 8 | | | |

FIG.3B

| | X0 | X1 | X2 | X3 | X4 | X5 | X6 | X7 | X8 | X9 | X10 | X11 | X12 | X13 | X14 | X15 | X16 | X17 | X18 | X19 | X20 | X21 | X22 | X23 | X24 | X25 | X26 |
|---|---|---|---|---|---|---|---|---|---|---|---|---|---|---|---|---|---|---|---|---|---|---|---|---|---|---|---|
| Y15 | | | -6 | -20 | -11 | -5 | -6 | -3 | -4 | | | | | | 7 | 8 | 7 | 6 | 1 | | | | -17 | | | | |
| Y14 | | | -18 | -80 | -34 | -13 | -3 | 10 | 20 | 25 | 21 | 21 | 16 | 17 | 11 | 16 | 15 | 20 | 15 | | -8 | -6 | -72 | -16 | | | |
| Y13 | | | | | 22 | 26 | 14 | 3 | | | | | | | | | | | | 6 | -12 | -21 | -17 | -5 | | | |
| Y12 | | | -5 | 6 | | | | | | | | | | | | | | | | 11 | 16 | 17 | 9 | | | | |
| Y11 | | | 2 | 18 | | | | | | | | | | | | | | | | 29 | 39 | 22 | 18 | 5 | | | |
| Y10 | | | 6 | 26 | | | | | | | | | | | | | | | | 9 | 23 | 5 | 25 | 8 | | | |
| Y9 | | | 5 | 27 | | | | | | | | | | | | | | | | | | | 24 | 8 | | | |
| Y8 | | | 6 | 26 | | | | | | | | | | | | | | | | | | -1 | 25 | 8 | | | |
| Y7 | | | 4 | 27 | | | | | | | | | | | | | | | | | | -4 | 26 | 8 | | | |
| Y6 | | | 6 | 31 | | | | | | | | | | | | | | | | | | -4 | 27 | 7 | | | |
| Y5 | | | 2 | 30 | | | 4 | | | | | | | | | | | | | | | -4 | 27 | 2 | | | |
| Y4 | | | | 17 | 10 | 12 | 15 | 22 | 29 | 30 | 36 | 30 | 30 | 28 | 23 | 19 | 14 | 2 | 17 | 15 | 14 | | 15 | -3 | | | |
| Y3 | | | -8 | -32 | 22 | | | | | | | | | | | | | 5 | -6 | -28 | -42 | 13 | -41 | -17 | | | |
| Y2 | | | -14 | -74 | -25 | | | | | | | | | | | | | -4 | -3 | -5 | -8 | 4 | -68 | -20 | | | |
| Y1 | | | | -11 | -3 | | | | | | | | | | | | | | | | | -40 | -10 | -4 | | | |
| Y0 | | | | | | | | | | | | | | | | | | | | | | -7 | | | | | |

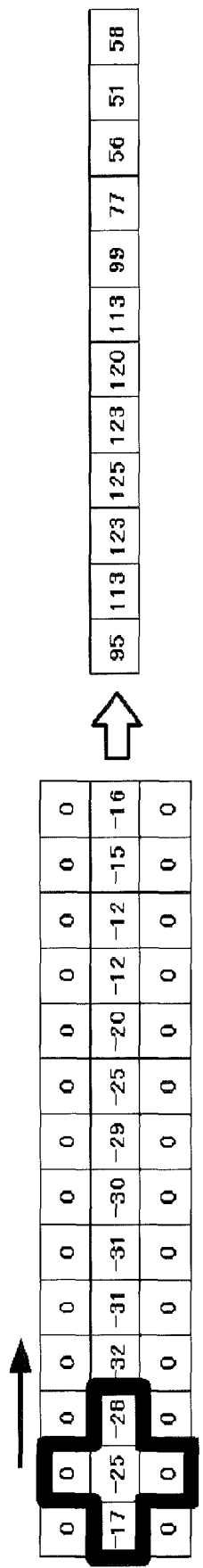

| | X0 | X1 | X2 | X3 | X4 | X5 | X6 | X7 | X8 | X9 | X10 | X11 | X12 | X13 | X14 | X15 | X16 | X17 | X18 | X19 | X20 | X21 | X22 | X23 | X24 | X25 | X26 |
|---|---|---|---|---|---|---|---|---|---|---|---|---|---|---|---|---|---|---|---|---|---|---|---|---|---|---|---|
| Y15 | | | | | | | | | | | | | | | | | | | | | | | | | | | |
| Y14 | | | | | | | | | | | | | | | | | | | | | | | | | | | |
| Y13 | | -13 | -122 | -232 | -194 | -91 | -29 | 31 | 71 | 91 | 88 | 74 | 66 | 50 | 48 | 50 | 59 | 64 | 55 | 4 | -63 | -149 | -215 | -109 | -16 | | |
| Y12 | | | | | | | | | | | | | | | | | | | | | | | | | | | |
| Y11 | | | | | | | | | | | | | | | | | | | | | | | | | | | |
| Y10 | | | | | | | | | | | | | | | | | | | | | | | | | | | |
| Y9 | | | | | | | | | | | | | | | | | | | | | | | | | | | |
| Y8 | | | | | | | | | | | | | | | | | | | | | | | | | | | |
| Y7 | | | | | | | | | | | | | | | | | | | | | | | | | | | |
| Y6 | | | | | | | | | | | | | | | | | | | | | | | | | | | |
| Y5 | | | | | | | | | | | | | | | | | | | | | | | | | | | |
| Y4 | | | | | | | | | | | | | | | | | | | | | | | | | | | |
| Y3 | | | | | | | | | | | | | | | | | | | | | | | | | | | |
| Y2 | | | | | | | | | | | | | | | | | | | | | | | | | | | |
| Y1 | | -14 | -110 | -230 | -149 | -22 | 48 | 88 | 110 | 125 | 132 | 126 | 118 | 109 | 93 | 75 | 52 | 12 | -55 | -124 | -174 | -201 | -247 | -129 | -20 | | |
| Y0 | | | | | | | | | | | | | | | | | | | | | | | | | | | |

FIG.10B

| | X0 | X1 | X2 | X3 | X4 | X5 | X6 | X7 | X8 | X9 | X10 | X11 | X12 | X13 | X14 | X15 | X16 | X17 | X18 | X19 | X20 | X21 | X22 | X23 | X24 | X25 | X26 |
|---|---|---|---|---|---|---|---|---|---|---|---|---|---|---|---|---|---|---|---|---|---|---|---|---|---|---|---|
| Y15 | | | | | | | | | | | | | | | | | | | | | | | | | | | |
| Y14 | | | | | | | | | | | | | | | | | | | | | | | | | | | |
| Y13 | | | | | | | | | | | | | | | | | | | | | | | | | | | |
| Y12 | | | | | | | | | | | | | | | | | | | | | | | | | | | |
| Y11 | | | | | | | | | | | | | | | | | | | | | | | | | | | |
| Y10 | | | | -112 | -215 | -119 | -3 | 60 | 84 | 89 | 88 | 92 | 96 | 94 | | | | | | | -156 | -247 | -99 | | | | |
| Y9 | | | | | | | | | | | | | | | | | | | | | | | | | | | |
| Y8 | | | | | | | | | | | | | | | | | | | | | | | | | | | |
| Y7 | | | | | | | | | | | | | | | | | | | | | | | | | | | |
| Y6 | | | | | | | | | | | | | | | | | | | | | | | | | | | |
| Y5 | | | | | | | | | | | | | | | | | | | | | | | | | | | |
| Y4 | | | | | | | | | | | | | | | | | | | | | | | | | | | |
| Y3 | | | | -137 | -232 | -96 | 25 | 66 | 91 | 101 | 100 | 107 | 113 | 106 | 22 | -151 | -230 | -99 | | | | | | | | | |
| Y2 | | | | | | | | | | | | | | | | | | | | | | | | | | | |
| Y1 | | | | | | | | | | | | | | | | | | | | | | | | | | | |
| Y0 | | | | | | | | | | | | | | | | | | | | | | | | | | | |

FIG.17

| | X0 | X1 | X2 | X3 | X4 | X5 | X6 | X7 | X8 | X9 | X10 | X11 | X12 | X13 |
|---|---|---|---|---|---|---|---|---|---|---|---|---|---|---|
| Y15 | 0 | 0 | 0 | 0 | 0 | 0 | 0 | 0 | 0 | 0 | 0 | 0 | 0 | 0 |
| Y14 | 0 | 0 | 0 | 0 | 0 | 0 | 0 | 0 | 0 | 0 | 0 | 0 | 0 | 0 |
| Y13 | 10 | 6 | 25 | 24 | 12 | 5 | -5 | -15 | -15 | -18 | -13 | -14 | -15 | -16 |
| Y12 | 20 | 85 | 30 | 10 | -1 | -31 | -30 | -25 | -25 | -20 | -12 | -12 | -5 | -3 |
| Y11 | 10 | 30 | -22 | -32 | -14 | 3 | 5 | 6 | 3 | 7 | 1 | 0 | 0 | 0 |
| Y10 | 0 | 0 | 0 | 0 | 0 | 0 | 0 | 0 | 0 | 0 | 0 | 0 | 0 | 0 |
| Y9 | 0 | 0 | 0 | 0 | 0 | 0 | 0 | 0 | 0 | 0 | 0 | 0 | 0 | 0 |

RANGE OF SEARCH FOR TARGET ROW

D(4,11)

D(1,12)

INPUT DEVICE AND CONTROL METHOD THEREOF

CROSS-REFERENCE TO RELATED APPLICATIONS

This application is a continuation of International Application No. PCT/JP2018/005456 filed on Feb. 16, 2018 and designated the U.S., which claims priority to Japanese Patent Application No. 2017-049586 filed on Mar. 15, 2017. The contents of these applications are incorporated herein by reference in their entirety.

TECHNICAL FIELD

The present invention relates to an input device such as a touch pad or a touch sensor used for inputting information in a device such as a computer or a smartphone, and in particular, to an input device for inputting information corresponding to a change in the capacitance caused by an approach of objects such as a finger or a pen.

BACKGROUND OF THE INVENTION

Devices such as a touch pad and a touch panel equipped with a sensor for detecting a contact position of an object such as a finger and a pen are widely used as input interfaces for a smartphone and the like. There are various types of sensors for detecting a contact position of an object, such as of a resistive-film type and of an optical-type. Especially, because a capacitive sensor is relatively simple and compact, many mobile devices have been adopting the capacitive sensor as their input interfaces in recent years.

There are multiple types of capacitive sensors. Major types of capacitive sensors are a self-capacitive sensor and a mutual capacitive sensor. The self-capacitive sensor detects a change in capacitance (self-capacitance) between a sensing electrode and an object (ground). Therefore, in order to detect self-capacitance at multiple locations, the same number of sensing electrodes as the locations is required. In contrast, because the mutual capacitive sensor detects a change in capacitance (mutual capacitance) between a driving electrode and a sensing electrode caused by an approach of an object, the mutual capacitive sensor can detect a change in capacitance at multiple locations with a single sensing electrode. Accordingly, the mutual capacitive sensor is more suitable for multi-point sensing than a self-capacitive sensor.

In the mutual capacitive sensor, when a finger approaches a portion at which mutual capacitance is formed (an intersection between a driving electrode and a sensing electrode), the mutual capacitance is reduced. In general, mutual capacitance formed between a driving electrode and a sensing electrode is very small, and a change of the mutual capacitance is even smaller. Thus, the mutual capacitance is subject to change depending on temperature and the like. Accordingly, in a general mutual capacitive sensor, a reference value for determining a change in mutual capacitance is appropriately updated at a predetermined time. Specifically, when a state in which a mutual capacitive sensor is not touched by an object such as a finger is continued, mutual capacitance is detected and magnitude of the detected mutual capacitance is set as a new reference value. Thereafter, a value obtained by subtracting detected mutual capacitance from the reference value is used as data indicating a change in mutual capacitance.

When an object (such as a human body), capacitively coupled with a ground strongly, approaches a capacitive sensor, its mutual capacitance decreases. However, when a conductor capacitively coupled with a ground weakly, such as a coin, approaches the capacitive sensor, its mutual capacitance increases. Although only occurrence of an increase of mutual capacitance is not regarded as approach of an object, if the above-described update of a reference value is performed while an object such as a coin is close to a capacitive sensor, and if mutual capacitance is reduced by the object being removed, the reduction of the mutual capacitance may be erroneously detected as an approach of an object.

Patent Document 1 describes a method of quickly resetting a reference value that causes such a false detection. In a device described in Patent Document 1, when an amount of change in mutual capacitance becomes equal to or exceeds a predetermined threshold, a cumulative value of the amount of change is stored in a storage unit, and a state transits to a floating conductor monitoring state for monitoring a floating conductor of floating potential. When an absolute value of a difference between an amount of change in mutual capacitance and the reference value is substantially equal to an absolute value of a difference between the cumulative value stored in the storage unit and the reference value, and a sign of these two differences are opposite, mutual capacitance is measured again and the measured mutual capacitance is set again as a new reference value. If, while the device is in the floating conductor monitoring state, the device recognizes a finger and thereafter the device transits to a state in which the finger is not recognized, it is presumed that there is no conductor such as a coin, and thus the floating conductor monitoring state is canceled.

Citation List

Patent Document

[Patent Document 1] Japanese Laid-open Patent Publication No. 2014-203205

In recent years, some touch pads for a laptop PC and the like are equipped with an NFC (Near Field Communication) reader/writer function. Such a touch pad can read/write data from/to an IC card if the IC card is held over an operating surface of the touch pad.

Typically, a loop antenna is embedded in an IC card in order to perform wireless communication with a reader/writer. When the IC card is placed on an operating surface of a touch pad, a change in mutual capacitance occurs because the loop antenna is placed in close proximity along a driving electrode and a sensing electrode. Because the loop antenna of the IC card is capacitively coupled with the ground weakly, mutual capacitance of the touch pad increases in a similar manner in which a coin or the like is placed on the operating surface. Accordingly, if the reference value is updated while the IC card is placed on the operating surface, and if the IC card is removed from the operating surface, a false detection occurs, similarly to the above-described case of placing a coin.

If a device of Patent Document 1 in a power-off state is turned on, with the IC card placed in advance on the operating surface of the device, because a change (increase) in mutual capacitance, which occurs by placing the IC card on the operating surface, has not been detected in the device, the device does not change to the floating conductor monitoring state. Accordingly, even if the IC card is removed from the operating surface after the touch pad is turned on, because the device is not in a floating conductor monitoring state at this time, a reduction in mutual capacitance that occurs by the removal of the IC card is erroneously recognized as a result of approaching of an object.

As an IC card is formed of a thin insulator, when fingers are moved closer to the IC card to remove the IC card while the IC card is placed on the operating surface of the device of Patent Document 1, a change in mutual capacitance is detected due to the fingers proximate to the IC card. As a result, when the IC card is removed from the operating surface, the fingers are instantly recognized, and the floating conductor monitoring status is canceled. Accordingly, when the IC card is removed, the reduction in mutual capacitance that occurs by the removal of the IC card is erroneously recognized as a result of approaching of an object.

SUMMARY OF THE INVENTION

An aspect of the present invention relates to an input device for inputting information corresponding to a change in capacitance in accordance with proximity of an object. The input device includes a sensor unit including multiple driving electrodes to which drive voltage is applied and multiple sensing electrodes, the sensor unit being configured to form multiple capacitive coupling parts between the sensing electrodes and the driving electrodes;

a capacitance detector configured to detect a capacitance value of each of the capacitive coupling parts formed between the sensing electrodes and the driving electrodes;

a two-dimensional data generating unit configured to calculate each sensing data value of the capacitive coupling parts, the sensing data value of a corresponding capacitive coupling part of the capacitive coupling parts indicating a difference between the capacitance value of the corresponding capacitive coupling part detected by the capacitance detector and a reference value defined for the corresponding capacitive coupling part, and generate a two-dimensional data matrix having multiple rows each corresponding to a sensing electrode of the multiple sensing electrodes and having multiple columns each corresponding to a driving electrode of the multiple driving electrodes, each of the rows and each of the columns including multiple entries each corresponding to a capacitive coupling part of the multiple capacitive coupling parts, the sensing data value of each of the capacitive coupling parts being stored into an entry of the multiple entries such that an arrangement of the sensing data value in the two-dimensional data matrix corresponds to an arrangement of the corresponding capacitive coupling part on the sensor unit;

a reference value updating unit configured to update the reference value of each of the capacitive coupling parts, based on the capacitance value of the corresponding capacitive coupling part detected by the capacitance detector;

an identifying unit configured to identify, as target data, a sensing data value indicating that the object is in proximity to the corresponding capacitive coupling part, from the two-dimensional data matrix generated by the two-dimensional data generating unit; and a determining unit configured to determine whether or not at least one of a target row, selected based on the row in the two-dimensional data matrix to which the target data belongs, and a target column, selected based on the column in the two-dimensional data to which the target data belongs, matches a first pattern indicating that multiple capacitive coupling parts each having a capacitance value greater than a reference value are arranged consecutively.

The reference value updating unit updates the reference value of each of the capacitive coupling parts if it is determined that at least one or both of the target row and the target column matches the first pattern.

BRIEF DESCRIPTION OF THE DRAWINGS

FIG. 3A is a diagram illustrating an example of a two-dimensional data matrix when a grounded loop-shape conductor is placed on an electrostatic capacitive sensor, which indicates that a sensing data pattern, detected when the grounded loop-shape conductor approaches the electrostatic capacitive sensor, becomes different from a sensing data pattern detected when a loop antenna in an IC card approaches the electrostatic capacitive sensor;

FIG. 3B is a diagram illustrating an example of the two-dimensional data matrix when the IC card is placed on the electrostatic capacitive sensor, which indicates that a sensing data pattern, detected when the grounded loop-shape conductor approaches the electrostatic capacitive sensor, becomes different from a sensing data pattern detected when a loop antenna in the IC card approaches the electrostatic capacitive sensor;

FIG. 9A is a diagram illustrating an example of a calculation result of the first evaluation value, which is a case conforming to a first pattern and a second pattern;

FIG. 9C is a diagram illustrating an example of the calculation result of the first evaluation value, and illustrates a case in which a difference between a detected capacitance and the reference value is large in the adjacent rows;

FIG. 9D is a diagram illustrating an example of the calculation result of the first evaluation value, which is a case in which no consecutive entries are present in the target row having the detected capacitance values larger than the reference value;

FIG. 10A is a diagram illustrating a series of the first evaluation values calculated based on the example of the two-dimensional data matrix in FIG. 4;

FIG. 10B is a diagram illustrating a series of the second evaluation value calculated based on the example of the two-dimensional data matrix in FIG. 4;

FIG. 17 is a diagram illustrating a method for selecting a target row in a fourth embodiment.

DETAILED DESCRIPTION OF THE PREFERRED EMBODIMENTS

First Embodiment

Hereinafter, an input device according to an embodiment of the present invention will be described with reference to the drawings.

Figure 1:
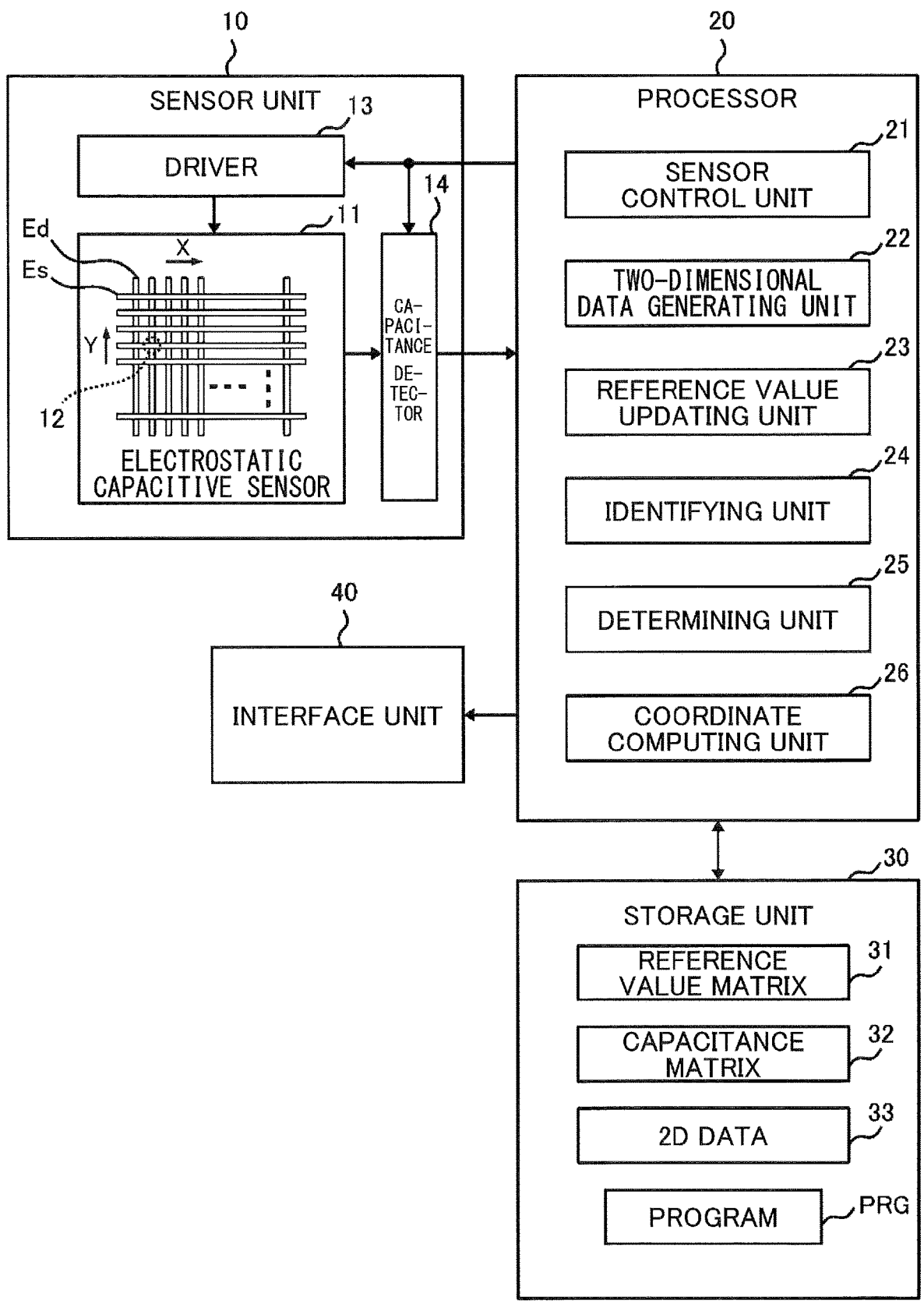
FIG. 1 is a diagram illustrating an example of a configuration of an input device according to an embodiment of the present invention.

FIG. 1 is a diagram illustrating an example of a configuration of the input device according to the embodiment of the present invention. The input device illustrated in FIG. 1 includes a sensor unit 10 including an electrostatic capacitive sensor 11, a processor 20, a storage unit 30, and an interface unit 40.

By an object such as a finger or a pen being approached to the electrostatic capacitive sensor 11 of the input device according to the present embodiment, the input device detects, as input information, information corresponding to a change in capacitance of the electrostatic capacitive sensor 11 at a position that the object approaches. Note that the term "proximity" used in the present specification means a state in which an object is close to (the electrostatic capacitive sensor 11), and is not limited as to whether the object is in a contacted state or not.

[Sensor Unit 10]

The sensor unit 10 is an apparatus for detecting proximity of objects, such as fingers or pens, at multiple respective sensing positions on an operating surface. The sensor unit 10 includes, in the example of FIG. 1, the electrostatic capacitive sensor 11, a driver 13, and a capacitance detector 14.

The electrostatic capacitive sensor 11 detects changes in capacitance caused by proximity of an object at the respective sensing positions. The electrostatic capacitive sensor 11 includes multiple driving electrodes Ed and multiple sensing electrodes Es. Between the driving electrodes Ed and the sensing electrodes Es, multiple capacitive coupling parts 12 are formed, each capacitance of which varies in response to proximity of an object.

Each of the driving electrodes Ed extends in a Y direction (vertical direction in FIG. 1), and the driving electrodes Ed are arranged side by side in an X direction (lateral direction in FIG. 1). The sensing electrodes Es each extend in the X direction and are arranged side by side in the Y direction. The driving electrodes Ed and the sensing electrodes Es intersect with each other to form a lattice pattern. At each intersection of the driving electrode Ed and the sensing electrode Es, the capacitive coupling part 12 is formed. In the example of FIG. 1, the driving electrode Ed and the sensing electrode Es are drawn in a simple strip, but other shapes of electrodes may be used. For example, each of the driving electrode Ed and the sensing electrode Es may be an electrode in which multiple diamond-shaped electrodes are cascaded.

The driver 13 applies drive voltage to each of the driving electrodes Ed in the electrostatic capacitive sensor 11 in accordance with control of a sensor control unit 21 (to be described below) in the processor 20. For example, the driver 13 selects one of the driving electrodes Ed one by one, and applies pulse voltage of predetermined amplitude to the selected driving electrode Ed.

The capacitance detector 14 detects capacitance of each of the capacitive coupling parts 12, based on electric charge that enters or leaves each of the capacitive coupling parts 12 by applying the drive voltage to each of the driving electrodes Ed. For example, the capacitance detector 14 includes a charge amplifier that provides charge to the capacitive coupling part 12 in the sensing electrode Es such that the sensing electrode Es is maintained at constant voltage when applying drive voltage to the driving electrode Ed. The charge amplifier outputs a signal in accordance with an amount of electric charge supplied to the capacitive coupling part 12, which is a signal in accordance with capacitance of the capacitive coupling part 12. By providing multiple charge amplifiers, the detection of capacitance at the multiple sensing electrodes Es can be performed in parallel. The capacitance detector 14 may also connect the multiple sensing electrodes Es to a charge amplifier via a multiplexer. By using the multiplexer, each of the sensing electrodes Es can be selected in turn and can be connected to the charge amplifier to detect the capacitance.

The sensor unit 10 converts a signal of the detected capacitance that is output from the capacitance detector 14, to a digital value by using an analog-to-digital converter (not illustrated). The sensor unit 10 outputs the detection result of the capacitance of each of the capacitive coupling parts 12 to the processor 20 as digital capacitance values S.

[Processor 20]

The processor 20 is a circuit that controls an overall operation of the input device, and includes, for example, a computer that performs processing in accordance with instruction codes of a program, or a dedicated logic circuit. All of the processing of the processor 20 may be performed based on a computer program, or some or all of the processing may be performed by the dedicated logic circuit.

In the example of FIG. 1, the processor 20 includes the sensor control unit 21, a two-dimensional data generating unit (2D data generating unit) 22, a reference value updating unit 23, an identifying unit 24, a determining unit 25, and a coordinate computing unit 26.

The sensor control unit 21 controls timing of detection performed in the sensor unit 10. Specifically, the sensor control unit 21 controls circuits such as the driver 13 and the capacitance detector 14 so that selection of the driving electrode Ed performed by the driver 13, generation of drive voltage performed by the driver 13, selection of the sensing electrode Es performed by the capacitance detector 14, and detection operation performed by the capacitance detector 14, are performed at an appropriate time.

The two-dimensional data generating unit 22 computes, for each of the capacitive coupling parts 12, a sensing data value D indicating a difference (B−S) between a capacitance value S of the corresponding capacitive coupling part 12 detected by the capacitance detector 14 and a reference value B of the capacitance of the corresponding capacitive coupling part 12 that is predetermined. The reference value B is a capacitance value of the capacitive coupling part 12 when an object such as a finger is not in proximity to the capacitive coupling part 12, and is set for each of the capacitive coupling parts 12.

The two-dimensional data generating unit 22 stores a set of sensing data values D calculated for each of the capacitive coupling parts 12 in the storage unit 30 as a two-dimensional data matrix 33 (may also be referred to as "two-dimensional data 33" or "2D data 33"). Each row of the two-dimensional data matrix 33 corresponds to one of the sensing electrode Es, and each entry in a row of the two-dimensional data 33 that corresponds to a certain sensing electrode Es corresponds to one of the capacitive coupling parts 12 in the certain sensing electrode Es. Each column of the two-dimensional data matrix 33 corresponds to one of the driving electrodes Ed, and each entry in a column of the two-dimensional data 33 that corresponds to a certain driving electrode Ed corresponds to one of the capacitive coupling parts 12 in the certain driving electrode Ed. Each of the sensing data values D is arranged in the two-dimensional data matrix 33, so as to correspond to a matrix arrangement of the capacitive coupling parts 12 on the operating surface of the electrostatic capacitive sensor 11.

For example, as illustrated in FIG. 1, the reference values B of capacitance of the respective capacitive coupling parts 12 are stored in the storage unit 30 as a reference value matrix 31. The two-dimensional data generating unit 22 stores the capacitance values of the respective capacitive coupling parts 12, which are detected by the capacitance detector 14, into the storage unit 30 as a capacitance matrix 32. The two-dimensional data generating unit 22 performs a matrix operation to subtract the capacitance matrix 32 from the reference value matrix 31, and stores a result of the matrix operation into the storage unit 30 as the two-dimensional data 33 (a matrix of sensing data).

The reference value updating unit 23 updates the reference values B of the respective capacitive coupling parts 12 based on the capacitance values S of the respective capacitive coupling parts 12 detected in the capacitance detector 14. For example, the reference value updating unit 23 updates the reference values B when it is determined that a state in which an object is not in proximity to the electrostatic capacitive sensor 11 has continued for a certain period of time, based on a processing result of the identifying unit 24 to be described below. The reference value B corresponding to a certain capacitive coupling part 12 may be the latest capacitance value S detected from the certain capacitive coupling part 12, or an average of the capacitance values S of the certain capacitive coupling part 12 that are detected for a predetermined period of time.

The reference value updating unit 23 also updates the reference values B in a case in which a determination result, indicating that the reference value B is abnormal, is obtained from the determining unit 25 to be described below.

The identifying unit 24 identifies one or more sensing data values D that indicate occurrence of approach of an object such as a finger to the capacitive coupling part 12, from the two-dimensional data 33 generated by the two-dimensional data generating unit 22. The sensing data value D indicating occurrence of approach of an object is referred to as "target data" (or "target data value"). For example, when a certain sensing data value D reaches a predetermined threshold (when a difference "B−S" obtained by subtracting the capacitance value S from the reference value B exceeds the threshold), the identifying unit 24 identifies the certain sensing data value D as the target data. In addition, the identifying unit 24 identifies the sensing data value D as the target data in a case to be described below in which the capacitance value S with respect to the reference value B is significantly decreased because of occurrence of abnormality of the reference value B.

The identifying unit 24 also determines whether or not an object is proximate, with respect to each of the sensing data values D constituting the two-dimensional data 33, and generates a proximity determination matrix representing a result of the determination by binary data (such as "1" and "0").

The coordinate computing unit 26 computes coordinates of a location to which an object has approached, based on the proximity determination matrix generated by the identifying unit 24. For example, the coordinate computing unit 26 specifies a region to which an object has approached based on the proximity determination matrix, and computes coordinates of a point in the region as coordinates of the proximity position of the object based on a peak value and the like of the sensing data value D in the specified region.

The determining unit 25 determines whether or not a row and a column in the two-dimensional data 33 that correspond to the target data match a predetermined pattern indicating that abnormality of the reference values B occurs. The abnormality of the reference values B determined by the determining unit 25 occurs in a case in which the reference values B are updated while a conductor such as a loop antenna in an IC card is placed in proximity to the driving electrode Ed or the sensing electrode Es, along the driving electrode Ed or the sensing electrode Es, as will be described below.

(Pattern Determination for Rows of 2D Data 33)

When determination with respect to a row in the two-dimensional data 33 is to be performed, the determining unit 25 selects, as a "target row" (may also be referred to as a "row of interest"), a row in the two-dimensional data 33 to which the target data identified by the identifying unit 24 belongs. The determining unit 25 determines whether or not the selected target row matches a "first pattern", and determines whether or not rows adjacent to the target row (adjacent rows) match a "second pattern". The "first pattern" is a pattern indicating presence of consecutive capacitive coupling parts 12 each having the capacitance value S greater than the reference value B (S>B). The "second pattern" is a pattern indicating presence of consecutive capacitive coupling parts 12 each having a capacitance value S (S≈B) approximating the reference value B.

When the determining unit 25 determines whether a target row matches the first pattern and whether its adjacent rows match the second pattern, the determining unit 25 specifically calculates a first evaluation value H1 for each of the sensing data values D in the target row. This first evaluation value H1 represents both a degree to which the capacitance value S in a target row exceeds the reference value B, and a degree of approximation of the capacitance value S in the adjacent rows to the reference value B. When a first evaluation value H1 corresponding to a certain sensing data value D in a target row is to be calculated, the determining unit 25 calculates the first evaluation value H1 based on a series of sensing data values including the certain sensing data value D in the target row and at least one sensing data value adjacent to the certain sensing data value D in a column direction.

In the present embodiment, the first evaluation value H1 is expressed by, for example, the following equation (Equation (1)):

$$H1 = H11 + H12 \quad (1)$$

"H11" in Equation (1) is referred to as a "target row evaluation value", which represents the degree to which the capacitance value S in a target row exceeds the reference value B. The target row evaluation value H11 calculated for sensing data value D(i,j) in a target row is expressed by, for example, the following equation (Equation (2)):

$$H11 = \alpha \cdot D(i-1,j) + \beta \cdot D(i,j) + \alpha \cdot D(i+1,j) \quad (2)$$

where "i" is an integer representing a row number of a row in the two-dimensional data 33, and "j" is an integer representing a column number of a column in the two-dimensional data 33. "D(i,j)" denotes an element (sensing data value D) at the i-th row and the j-th column in the two-dimensional data 33. "α" and "β" each denote weighting factors. For example, a value of the weighting factor α is set to "−1", and a value of the weighting factor β is set to "−2". Because the sensing data value D is calculated by performing an operation "B−S", if the capacitance value S exceeds the reference value B, the sensing data value D becomes a negative value. Therefore, in a case in which the weighting factors α and β are set to negative values, as the degree to which the capacitance value S exceeds the reference value B increases, the target row evaluation value H11 increases in a positive direction accordingly.

In Equation (1), "H12" is referred to as an "adjacent row evaluation value" representing the degree of approximation of the capacitance value S in the adjacent row to the reference value B. The adjacent row evaluation value H12 calculated for the sensing data value D(i,j) in the target row is expressed, for example, by the following equation (Equation (3)):

$$H12 = \gamma \cdot |D(i,j-1)| + \gamma \cdot |D(i,j+1)| \quad (3)$$

"γ" in Equation (3) is a weighting factor, which is set to "−2" for example. In a case in which the weighting factor γ is set to a negative value, the adjacent row evaluation value H12 becomes negative. The adjacent row evaluation value H12 becomes close to zero as absolute values of the sensing data values D(i,j−1) and D(i,j+1) adjacent to the sensing data value D(i,j) in the column direction decrease (as the capacitance values S of the adjacent rows become closer to the reference values B).

Accordingly, the first evaluation value H1, which is a sum of the target row evaluation value H11 and the adjacent row evaluation value H12, increases in a positive direction as the capacitance value S becomes larger relative to the reference value B with respect to the target data D(i,j) and the sensing data values D(i−1,j) and D(i+1,j) each positioned before and after the target data D(i,j). In addition, the first evaluation value H1 increases in the positive direction as the capacitance value S becomes closer to the reference value B with respect to the sensing data values D(i,j−1) and D(i,j+1) adjacent to the target data D(i,j) in the column direction.

The determining unit 25 calculates the above-described first evaluation value H1 for each sensing data value D in the target row, and performs determination with respect to a series of the first evaluation values H1 obtained as a result of the calculation. Specifically, in a case in which a predetermined number or more of the first evaluation values H1, each being equal to or greater than a predetermined threshold, are arranged successively in the series of the first evaluation values H1 of the target row, the determining unit 25 determines that the target row matches the first pattern and that the adjacent row(s) match(es) the second pattern. Hereinafter, a condition in which a target row matches the first pattern and in which an adjacent row(s) match(es) the second pattern is referred to as a "first condition".

When it is determined by the determining unit 25 that the "first condition" is satisfied, the reference value updating unit 23 regards the reference values B as being in abnormal states, and executes a process of updating the reference values B.

(Pattern Determination for Columns of 2D Data 33)

When determination with respect to columns in the two-dimensional data 33 is to be performed, the determining unit 25 selects a column in the two-dimensional data 33 to which the target data specified by the identifying unit 24 belongs.

The selected column is referred to as a "target column" (may also be referred to as a "column of interest"). The determining unit 25 determines whether or not the selected target column matches a first pattern, and determines whether or not the columns (adjacent columns) adjacent to the target column match a second pattern.

When the determining unit 25 determines whether a target column matches the first pattern and whether its adjacent columns match the second pattern, the determining unit 25 specifically calculates a second evaluation value H2 for each of the sensing data values D in the target column. This second evaluation value H2 represents both a degree to which the capacitance value S in a target column exceeds the reference value B, and a degree of approximation of the capacitance value S in the adjacent columns to the reference value B. When the second evaluation value H2 corresponding to a certain sensing data value D in a target column is to be calculated, the determining unit 25 calculates the second evaluation value H2 based on a series of sensing data values including the certain sensing data value D in the target column and at least one sensing data value adjacent to the certain sensing data value D in the row direction.

In the present embodiment, the second evaluation value H2 is represented by, for example, the following equation (Equation (4)):

$$H2 = H21 + H22 \quad (4)$$

"H21" in Equation (4) is referred to as a "target column evaluation value", which represents the degree to which the capacitance value S in a target column exceeds the reference value B. The target column evaluation value H21 calculated for the sensing data value D(i,j) in a target column is expressed, for example, by the following equation (Equation (5)):

$$H21 = v \cdot D(i,j-1) + \eta \cdot D(i,j) + v \cdot D(i,j+1) \quad (5)$$

However, in Equation (5), "v" and "η" denote weighting factors. For example, the weighting factor v is set to "−1", which is the same as the weighting factor α, and the weighting factor η is set to "−2", which is the same as the weighting factor β. In a case in which the weighting factors v and η are set to negative values, as the degree to which the capacitance value S exceeds the reference value B increases, the target column evaluation value H21 increases in a positive direction accordingly.

In Equation (4), "H22" is referred to as an "adjacent column evaluation value" representing the degree of approximation of the capacitance value S in the adjacent column to the reference value B. The adjacent column evaluation value H22 calculated for the sensing data value D(i,j) in the target column is expressed, for example, by the following equation (Equation (6)):

$$H22 = \kappa \cdot |D(i-1,j)| + \kappa \cdot |D(i+1,j)| \quad (6)$$

In Equation (6), "κ" is a weighting factor, which is set to the same value "−2" as the weighting factor γ, for example. In a case in which the weighting factor κ is set to a negative value, the adjacent column evaluation value H22 becomes negative. The adjacent column evaluation value H22 becomes close to zero as the absolute values of the sensing data values D(i−1,j) and D(i+1,j) adjacent to the sensing data value D(i,j) in the row direction decreases (as the capacitance values S of the adjacent columns become closer to the reference values B).

Accordingly, the second evaluation value H2, which is a sum of the target column evaluation value H21 and the adjacent column evaluation value H22, increases in a positive direction as the capacitance value S becomes larger relative to the reference value B with respect to the target data D(i,j) and the sensing data values D(i,j−1) and D(i,j+1) each positioned before and after the target data D(i,j). In addition, the second evaluation value H2 increases in a positive direction as the capacitance value S becomes closer to the reference value B with respect to the sensing data values D(i−1,j) and D(i+1,j) adjacent to the target data D(i,j) in the row direction.

The determining unit 25 calculates the above-described second evaluation value H2 for each sensing data value D in the target column, and performs determination with respect to a series of the second evaluation values H2 obtained as a result of the calculation. Specifically, in a case in which a predetermined number or more of the second evaluation values H2, each being equal to or greater than a predetermined threshold, are arranged successively in the series of the second evaluation values H2 of the target column, the determining unit 25 determines that the target column matches the first pattern and the adjacent column(s) match(es) the second pattern. Hereinafter, a "second condition" refers to a condition in which a target column matches the first pattern and an adjacent column(s) match(es) the second pattern.

When it is determined by the determining unit 25 that the "second condition" is satisfied, the reference value updating unit 23 regards the reference values B as being in abnormal states, and executes the process of updating the reference value B.

[Storage Unit 30]

The storage unit 30 stores constant data or variable data (reference value matrix 31, capacitance matrix 32, and two-dimensional data 33) used for processes in the processor 20. In a case in which the processor 20 includes a computer, the storage unit 30 may store a program PRG executed in this computer. The storage unit 30 is configured by, for example, a volatile memory such as a DRAM or a SRAM and a non-volatile memory such as flash memory.

[Interface Unit 40]

The interface unit 40 is a circuit for exchanging data between the input device and other control devices (such as a control IC for an information processing device equipped with the input device). The processor 20 outputs information stored in the storage unit 30 (computation result of the coordinates of an object, and the like) from the interface unit 40 to a control device (not illustrated).

The program PRG stored in the storage unit 30 may be recorded in advance into a ROM or the like of the storage unit 30. Alternatively, the program PRG to be stored into the storage unit 30 may be downloaded from a host device (not illustrated) through the interface unit 40, or may be read out from a medium such as an optical disk or USB memory by using a reading device (not illustrated).

Referring now to FIGS. 2A to 6B, a situation that the reference values B become in an abnormal state will be described, which occurs when the reference values B are updated while a loop antenna in the IC card is placed on the electrostatic capacitive sensor 11.

Figure 2A:
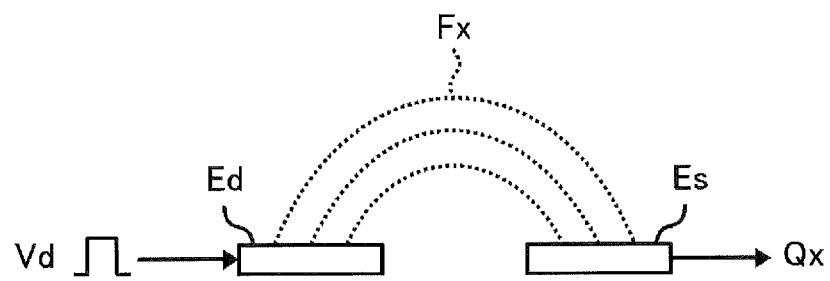
FIG. 2A is a diagram for explaining a change in mutual capacitance caused by an approach of an object, illustrating a state in which the object is not in proximity.

FIG. 2 is a diagram illustrating a change in capacitance (hereinafter referred to as "mutual capacitance") between the driving electrode Ed and the sensing electrode Es, which is caused by an object being approached. When drive voltage Vd is applied to the driving electrode Ed, an electric field is generated between the driving electrode Ed and the sensing electrode Es, as illustrated in FIG. 2A. The capacitance detector 14 detects the mutual capacitance based on electric charge Qx supplied to the sensing electrode Es in response to the application of the drive voltage Vd.

Figure 2B:
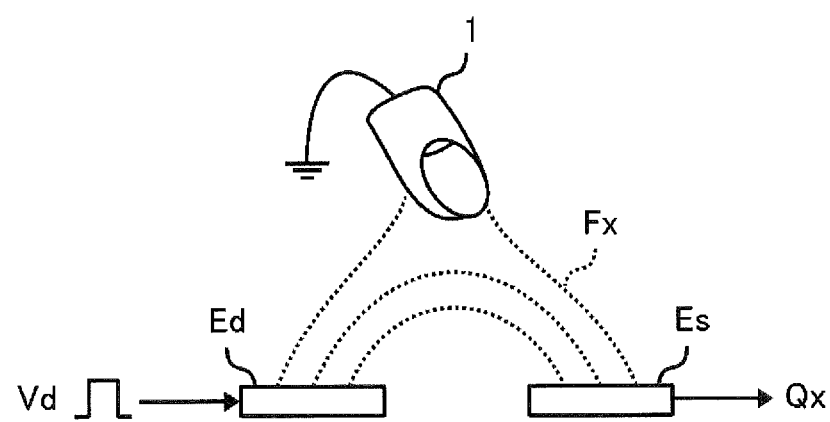
FIG. 2B is a diagram for explaining a change in mutual capacitance caused by an approach of an object, illustrating a state in which the object is in proximity.

Because an object 1, such as a finger, has relatively strong capacitive coupling with the ground and its capacitance is sufficiently larger than the mutual capacitance, the object 1 may be regarded as being grounded as illustrated in FIG. 2B. Accordingly, as the object 1 approaches between the driving electrode Ed and the sensing electrode Es, a part of the electrical field Fx passing between these electrodes is shielded by the object 1. Therefore, when the object 1 that can be regarded as being grounded is approached, the mutual capacitance decreases relatively.

FIGS. 3A and 3B are diagrams for explaining that a pattern of sensing data values D obtained when a grounded loop-shape conductor approaches is different from a pattern of sensing data values D obtained when a loop antenna in an IC card approaches. FIG. 3A illustrates an example of the two-dimensional data 33 when a grounded loop-shape conductor is placed on the electrostatic capacitive sensor 11, and FIG. 3B illustrates an example of the two-dimensional data 33 when the IC card is placed on the electrostatic capacitive sensor 11.

In the example of FIGS. 3A and 3B, the number of the driving electrodes Ed is 27 and the number of the sensing electrodes Es is 16. "Y0" to "Y15" in the leftmost column of a table illustrated in FIG. 3A each indicate (an identifier of) a row of the two-dimensional data 33, and "X0" to "X26" in the top row each indicate (an identifier of) a column of the two-dimensional data 33. A value in each of the entries of the table in FIG. 3A (or FIG. 3B) represents magnitude of the sensing data value D. However, in order to facilitate visibility of the table (to make overall values easier to see), an entry corresponding to the sensing data value D of "0" is illustrated as a blank entry. Because the sensing data value D has a value of "B−S", which is a value obtained by subtracting the capacitance value S from the reference value B, a positive sensing data value D indicates that the capacitance value S is less than the reference value B, i.e., that the mutual capacitance is reduced by approach of an object.

When the grounded loop-shape conductor is placed on the electrostatic capacitive sensor 11, all of the sensing data values D of the two-dimensional data 33 corresponding to locations proximate to the conductor become relatively large positive values, as illustrated in FIG. 3A. In contrast, as the loop antenna in the IC card is covered with an insulator, the loop antenna is, unlike the grounded loop conductor, insulated from the ground. Also, because of a relatively small size of the loop antenna, the capacitive coupling to the ground is relatively weak. Due to these differences, the two-dimensional data 33 when the IC card is placed on the electrostatic capacitive sensor 11 exhibits a pattern of the sensing data values D different from that illustrated in FIG. 3A.

As can be seen from FIG. 3B, the sensing data values D, corresponding to four corners of a rectangular area surrounding an outer periphery of the loop antenna, are negative. That is, the capacitance values S corresponding to the four corners are larger than the reference values B. In addition, although the sensing data values D corresponding to locations proximate to the conductor of the loop antenna are positive, the absolute values of the sensing data values D are smaller than that of the grounded loop conductor. Accordingly, the position to which the conductor of the loop antenna is approached is not determined to be a position where an object is in proximity. When the IC card is left on the electrostatic capacitive sensor 11 for a certain period of time, it is determined that the object is not in proximity to the electrostatic capacitive sensor 11, and this state continues for the certain period of time. Therefore, the process of updating the reference values B is performed in the reference value updating unit 23.

Figure 4:
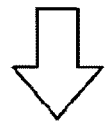
FIG. 4 is a diagram illustrating an example of the two-dimensional data matrix when the IC card is removed after reference values are updated while the IC card is placed.

FIG. 4 is a diagram illustrating an example of the two-dimensional data 33 when an IC card is removed after updating the reference values B while the IC card is placed on the electrostatic capacitive sensor 11. An upper portion of FIG. 4 illustrates the two-dimensional data 33 after the reference values B were updated in the state of FIG. 3B when the IC card is placed. By updating the reference values B, each capacitance value S becomes equal to the corresponding reference value B, so that each sensing data value D of the two-dimensional data 33 becomes zero. When the IC card is removed from the electrostatic capacitive sensor 11 at this state, as illustrated in a lower portion of FIG. 4, two-dimensional data 33 composed of sensing data values D, each of which is substantially equal to an inverted value of the corresponding sensing data value D in FIG. 3B, is obtained. In the two-dimensional data 33 of the lower portion of FIG. 4, the sensing data values D at four corners of an rectangular area, which are negative in FIG. 3B, are positive. Because a large positive sensing data value D indicates proximity of an object, in the two-dimensional data 33 in the lower portion of FIG. 4, it is determined that an object is in proximity to the four corners of the rectangular area.

Figure 5A:
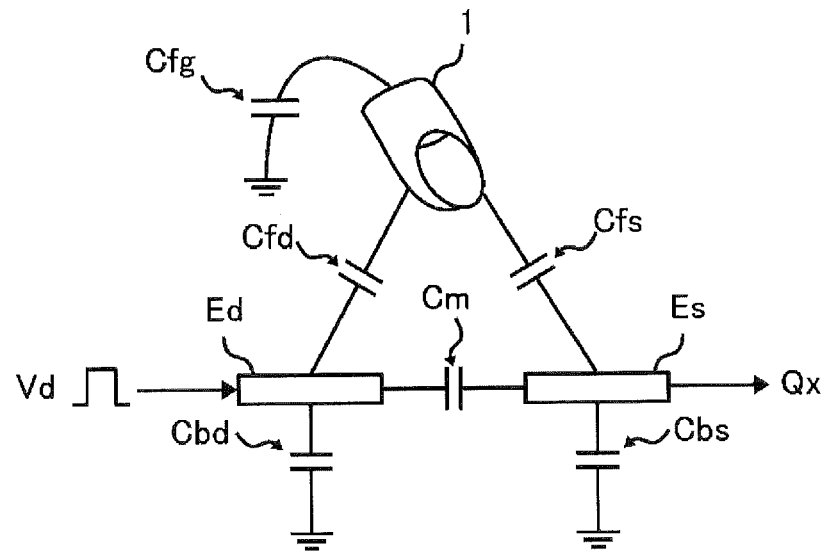
FIG. 5A is a diagram illustrating a parasitic capacitor formed between an object proximate to an electrostatic capacitive sensor and each electrode of the electrostatic capacitive sensor, in a case in which an object with strong capacitive coupling to the ground, such as a finger, approaches the electrostatic capacitive sensor.
Figure 5B:
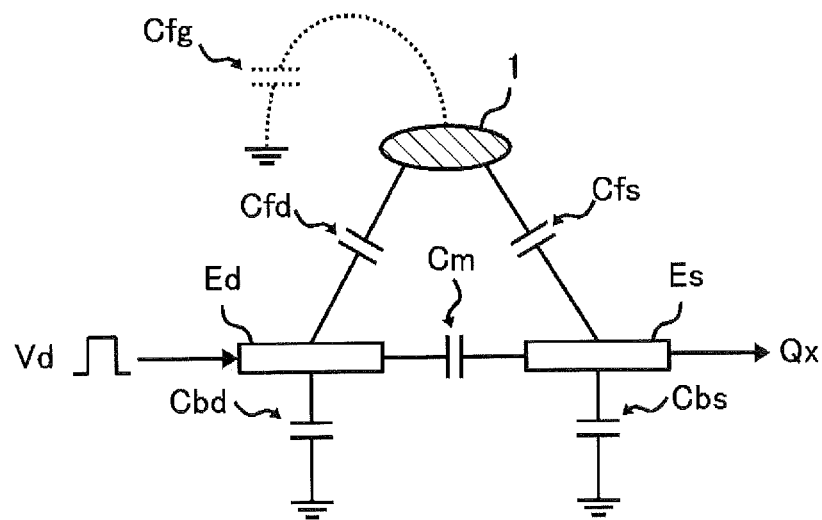
FIG. 5B is a diagram illustrating a parasitic capacitor formed between an object proximate to an electrostatic capacitive sensor and each electrode of the electrostatic capacitive sensor, in a case in which a conductive object with weak capacitive coupling to the ground approaches the electrostatic capacitive sensor.

FIGS. 5A and 5B are diagrams illustrating parasitic capacitors formed between an object proximate to an electrostatic capacitive sensor and each electrode of the electrostatic capacitive sensor. FIG. 5A illustrates a case in which an object 1, such as a finger, with strong capacitive coupling to the ground is approaching the electrostatic capacitive sensor 11, and FIG. 5B illustrates a case in which a conductive object 1 with weak capacitive coupling to the ground is approaching the electrostatic capacitive sensor 11. In each of the figures, "Cfg" represents a capacitor formed between the object 1 and the ground, "Cm" represents a capacitor formed between the driving electrode Ed and the sensing electrode Es, "Cfd" represents a capacitor formed between the driving electrode Ed and the object 1, "Cfs" represents a capacitor formed between the sensing electrode Es and the object 1, "Cbd" represents a capacitor formed between the driving electrode Ed and the ground, and "Cbs" represents a capacitor formed between the sensing electrode Es and the ground.

The capacitance detector 14 detects capacitance (mutual capacitance) between the driving electrode Ed and the sensing electrode Es based on electric charge Qx supplied to the sensing electrode Es held at a constant potential. An amount of this charge Qx is primarily influenced by the capacitors Cm, Cfs, Cfd, and Cfg. In the case of FIG. 5A, because the object 1 is considered to be grounded, the amount of charge amount of the capacitor Cfs is almost unchanged if the sensing electrode Es is at a constant potential. Thus, the charge Qx is less affected by the capacitors Cfs, Cfd, and Cfg, and is generally proportional to the capacitance of the capacitor Cm. As described in FIG. 2B, the capacitance of the capacitor Cm is reduced by proximity of an object that may be considered grounded.

In contrast, in the case of FIG. 5B, because the capacitor Cfg has relatively small capacitance, the potential of the object 1 varies. Thus, the charge Qx is also affected by the capacitors Cfs, Cfd, and Cfg. If the capacitance of the capacitors Cfd and Cfs is sufficiently smaller than that of the capacitor Cfg, mutual capacitance Cds between the driving electrode Ed and the sensing electrode Es is expressed by the following equation (Equation (7)):

$$Cds = Cm + (Cfs \cdot Cfd)/Cfg \quad (7)$$

Note that, in Equation (7), "Cm", "Cfs", "Cfd", and "Cfg" denote capacitance of the capacitors Cm, Cfs, Cfd, and Cfg, respectively. As can be seen from Equation (7), when the object 1, which is not considered to be grounded, approaches an electrostatic capacitive sensor, the mutual capacitance Cds between the driving electrode Ed and the sensing electrode Es becomes greater than the capacitance of the capacitor Cm.

Figure 6A:
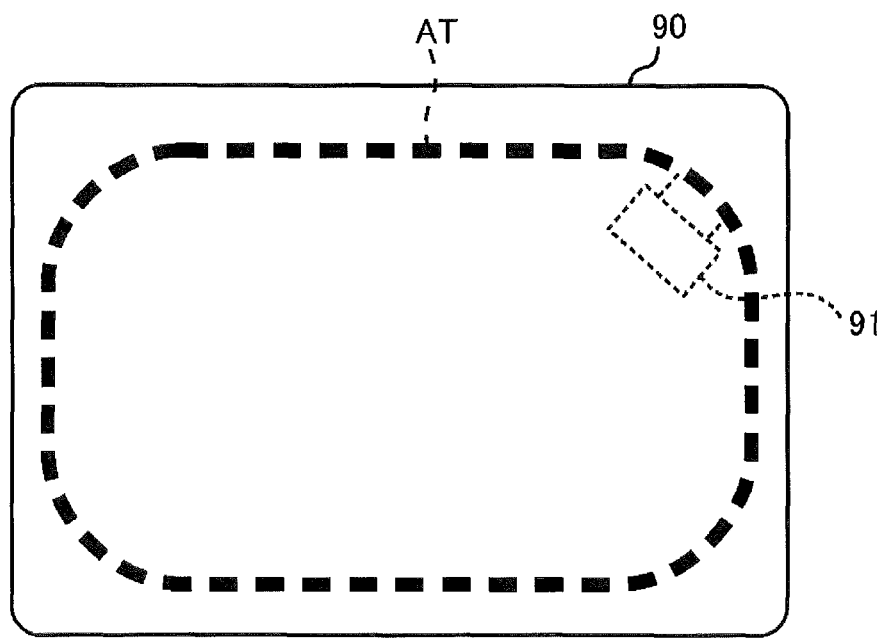
FIG. 6A is a diagram illustrating an example of a loop antenna embedded in an IC card, which explains that each electrode of the electrostatic capacitive sensor and a loop antenna cause capacitive coupling.
Figure 6B:
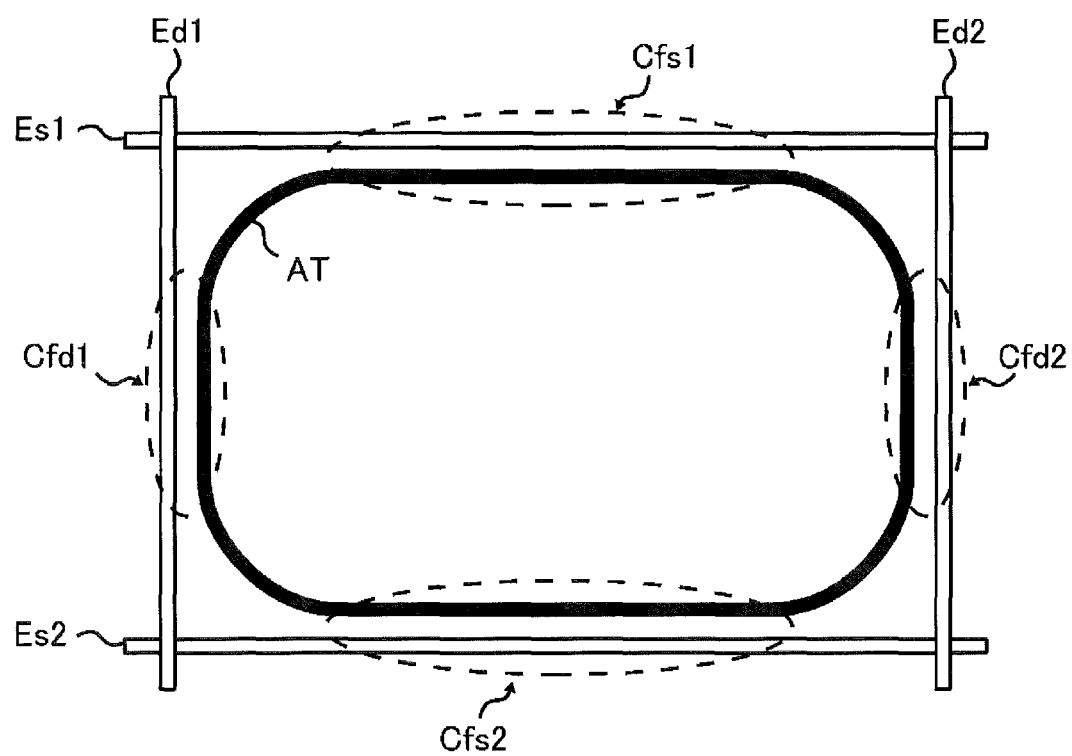
FIG. 6B is a diagram illustrating an example of a region in which capacitive coupling occurs between a sensing electrode and a loop antenna and between a driving electrode and the loop antenna, which explains that each electrode of the electrostatic capacitive sensor and a loop antenna cause capacitive coupling.

FIG. 6 is a diagram illustrating that each electrode of the electrostatic capacitive sensor 11 and the loop antenna cause capacitive coupling. FIG. 6A illustrates an example of a loop antenna AT embedded in an IC card 90, and FIG. 6B illustrates an example of a region in which capacitive coupling occurs between the sensing electrode Es and the loop antenna AT and between the driving electrode Ed and the loop antenna AT.

As illustrated in FIG. 6A, the loop antenna AT having a shape of a rectangle with rounded corners is embedded within the IC card 90, and an IC chip 91 is connected to the loop antenna AT. When the IC card 90 is placed on the operating surface of the electrostatic capacitive sensor 11, as illustrated in FIG. 6B, areas (each indicated by a dotted line) are generated in which the loop antenna AT and the electrode (Es, Ed) are in almost parallel and are in close proximity to each other. In the regions in which the sensing electrode Es1 is in close proximity to the loop antenna AT and in which the sensing electrode Es2 is in close to the loop antenna AT, capacitors Cfs1 and Cfs2 are formed, respectively. In the regions in which the driving electrode Ed1 is in close proximity to the loop antenna AT and in which the driving electrode Ed2 is in close proximity to the loop antenna AT, capacitors Cfd1 and Cfd2 are formed, respectively. As the capacitance of these capacitors increases, a numerator of a second term in the right side of Equation (7) increases, and thereby the capacitance Cds increases. Accordingly, at four locations at which the two sensing electrodes Es1 and Es2 and the two driving electrodes Ed1 and Ed2 intersect each other, capacitance Cds increases. For this reason, as illustrated in the lower portion of FIG. 4, the sensing data values D become greater at four corners of a rectangular area surrounding an outer periphery of the loop antenna AT.

In the input device according to the present embodiment, a pattern of the sensing data values D appearing in the two-dimensional data 33 is used to determine an abnormality of the above-described reference value B. In the example of the two-dimensional data 33 illustrated in the lower portion of FIG. 4, the sensing data values D(3,1), D(3,13), D(22,1) and D(22,13) enclosed in thick squares have positive values that exceed a predetermined threshold. Accordingly, the identifying unit 24 identifies these sensing data values D as the target data. Typically, the target data indicates proximity of an object. However, when the above-described abnormality of the reference value B occurs, the two-dimensional data 33 exhibits two features related to the target data.

A first feature is that negative sensing data values D appear successively in a row and a column to which the target data belongs. Because the negative sensing data value D indicates that the capacitance value S is greater than the reference value B, an event that the negative sensing data values D appear successively indicates that the capacitive coupling parts 12 each having a capacitance value S (S>B) greater than a reference value B are arranged successively. The pattern of the sensing data values D corresponding to this first feature is "the first pattern".

A second feature is that the sensing data values D close to zero appear successively in rows adjacent to the row to which the target data belongs or in columns adjacent to the column to which the target data belongs. Because the sensing data value D close to zero indicates that the capacitance value S approximates the reference value B, an event that the sensing data values D close to zero appear successively indicates that the capacitive coupling parts 12 each having a capacitance value S (S≈B) approximating the reference value B are arranged successively. The pattern of sensing data values D corresponding to this second feature is "the second pattern".

A method of determining the first pattern and the second pattern by the determining unit 25 will be described in detail with reference to FIGS. 7A to 10B.

When determining presence of the first pattern and the second pattern in the row direction, the determining unit 25 selects, as a target row, a row of the two-dimensional data 33 to which target data belongs. In the case of the two-dimensional data 33 illustrated in the lower portion of FIG. 4, a target row corresponding to target data D(3, 1) or D(22, 1) is "Y1", and a target row corresponding to target data D(3, 13) or D(22, 13) is "Y13".

When determining presence of the first pattern and the second pattern in the column direction, the determining unit 25 selects, as a target column, a column of the two-dimensional data 33 to which target data belongs. In the case of the two-dimensional data 33 illustrated in the lower portion of FIG. 4, a target column corresponding to target data D(3, 1) or D(3, 13) is "X3", and a target column corresponding to target data D(22, 1) or D(22, 13) is "X22".

Figure 7A:
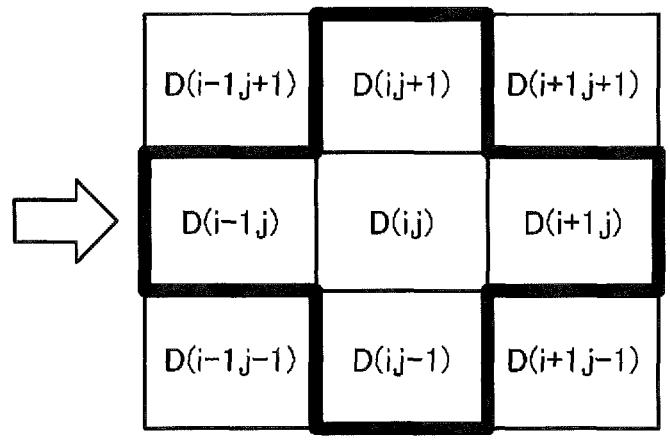
FIG. 7A is a diagram illustrating a method for calculating a first evaluation value used for determination performed in a first embodiment, which illustrates a sensing data value in a target row and its surrounding sensing data values.
Figure 7B:
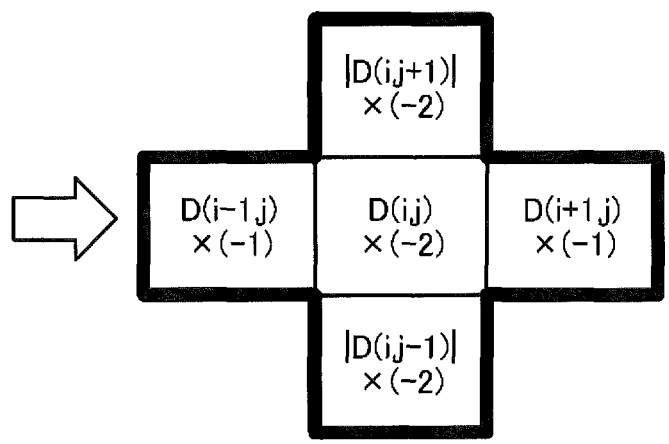
FIG. 7B is a diagram illustrating the method for calculating the first evaluation value used for the determination performed in the first embodiment, which illustrates details of calculation applied to the respective sensing data values.

For each of the sensing data values D in a selected target row, the determining unit 25 calculates the first evaluation value H1 represented by Equations (1) to (3). FIGS. 7A and 7B are diagrams for explaining a method for calculating the first evaluation value H1. FIG. 7A illustrates a sensing data value D(i,j) in a target row indicated by an arrow and its surrounding sensing data values D, and FIG. 7B illustrates details of arithmetic operations applied to these sensing data values D. As illustrated in FIG. 7B, the determining unit 25 multiplies the sensing data values D(i−1,j), D(i,j), and D(i+1,j) arranged consecutively in the target row by "−1", "−2", and "−1" respectively as weighting factors. The determining unit 25 also converts the sensing data values D(i,j−1) and D(i,j+1) adjacent to the sensing data value D(i,j) in the column direction, to absolute values, and multiplies each of the absolute values by "−2" as a weighting factor. The determining unit 25 calculates the first evaluation value H1 for the sensing data value D(i,j) by adding together the calculation results of each of the sensing data values (D(i−1,j), D(i,j), D(i+1,j), D(i,j−1), and D(i,j+1)).

Figure 8A:
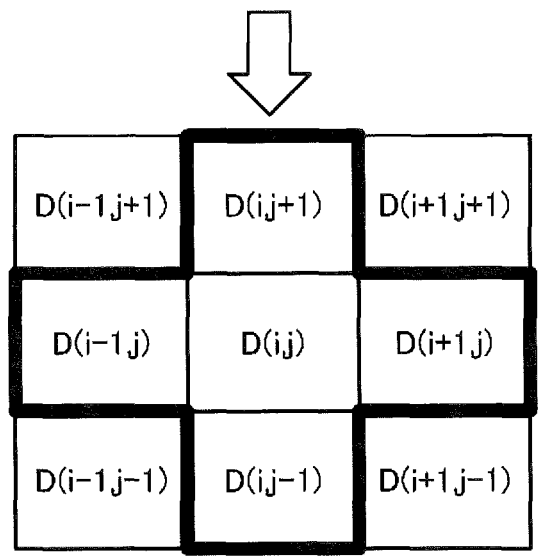
FIG. 8A is a diagram illustrating a method for calculating a second evaluation value used for determination performed in the first embodiment, which illustrates a sensing data value in a target column and its surrounding sensing data values.
Figure 8B:
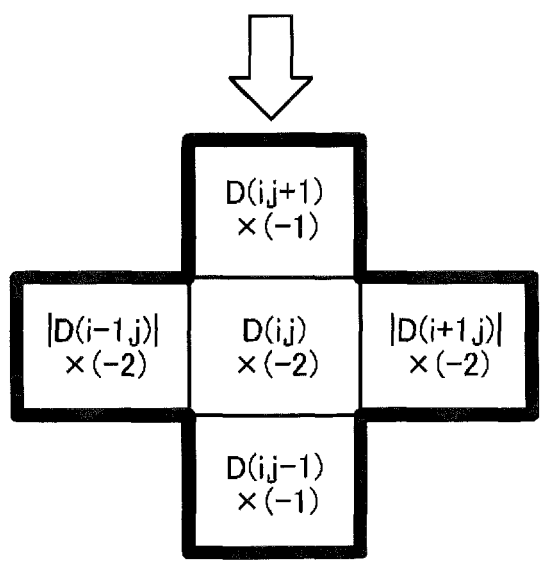
FIG. 8B is a diagram illustrating the method for calculating the second evaluation value used for the determination performed in the first embodiment, which illustrates details of calculation applied to the respective sensing data values.

The determining unit 25 calculates the second evaluation value H2 represented by Equations (4) to (6) for each of the sensing data values D in a selected target column. FIGS. 8A and 8B are diagrams for explaining a method for calculating the second evaluation value H2. FIG. 8A illustrates a sensing data value D(i,j) in a target column indicated by an arrow and its surrounding sensing data values D, and FIG. 8B illustrates details of arithmetic operations applied to these sensing data values D. As illustrated in FIG. 8B, the determining unit 25 multiplies the sensing data values D(i,j−1), D(i,j), and D(i,j+1) arranged consecutively in the target column by "−1", "−2", and "−1", as weighting factors respectively. The determining unit 25 also converts the sensing data values D(i−1,j) and D(i+1,j) adjacent to the sensing data value D(i,j) in the row direction into absolute values, and multiplies each of the absolute values by "−2" as a weighting factor. The determining unit 25 calculates the second evaluation value H2 for the sensing data value D(i, j) by adding together the calculation results of each of the sensing data values (D(i,j−1), D(i,j), D(i,j+1), D(i−1,j), and D(i+1,j)).

Figure 9B:
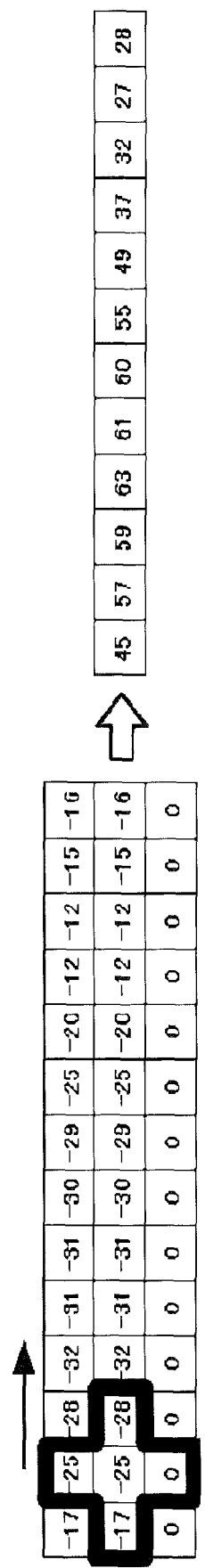
FIG. 9B is a diagram illustrating an example of the calculation result of the first evaluation value, and illustrates a case in which a difference between a detected capacitance and a reference value is large in an adjacent row.
Figure 9C:
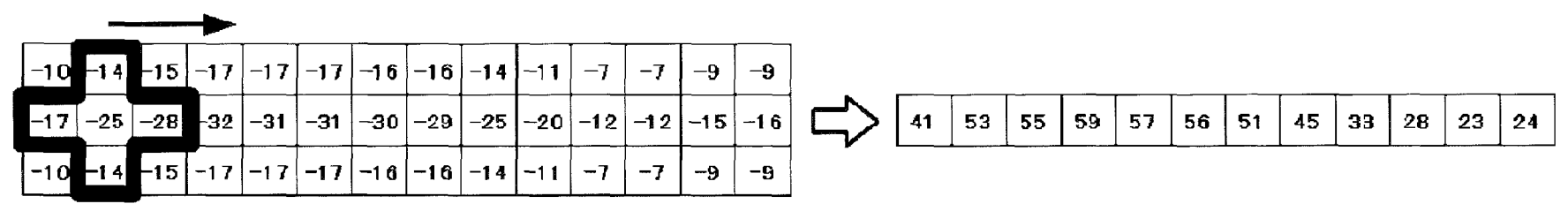
Figure 9D:
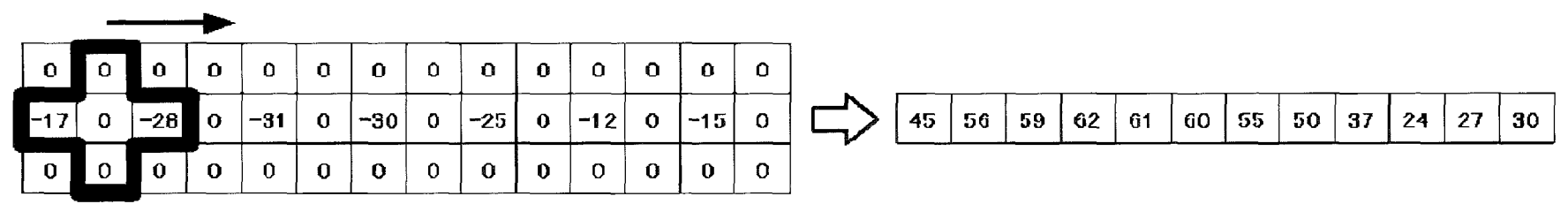

FIGS. 9A to 9D are diagrams illustrating examples of calculation results of the first evaluation value H1. FIG. 9A illustrates a calculation result in a case in which a target row and adjacent rows match the first pattern and the second pattern. FIGS. 9B and 9C illustrate calculation results in a case in which an adjacent row includes entries (sensing data values) each having a large difference between the capacitance value S and the reference value B. FIG. 9D illustrates a calculation result in a case in which entries each having a capacitance value S greater than a reference value B are not arranged consecutively in a target row. By comparing these calculation results, it is found that the first evaluation values H1 are obviously smaller in the case of FIGS. 9B and 9C, where an adjacent row does not match the second pattern, or in the case of FIGS. 9D, where the target row does not match the first pattern, compared to the case of FIG. 9A. Accordingly, it is possible to determine whether or not the "first condition", in which a target row matches the first pattern and in which an adjacent row matches the second pattern, is satisfied, based on the first evaluation value H1. Similarly, whether or not the "second condition", in which a target column matches the first pattern and in which an adjacent column matches the second pattern, is satisfied can be determined based on the second evaluation value H2.

FIGS. 10A and 10B are diagrams illustrating a series of the first evaluation values H1 and a series of the second evaluation values H2 calculated based on the example of the two-dimensional data 33 in the lower portion of FIG. 4. FIG. 10A illustrates a calculation result of the series of the first evaluation value H1, and FIG. 10B illustrates a calculation result of the series of the second evaluation value H2. Each entry in FIGS. 10A and 10B that is boxed in a thick square indicates an evaluation value of 60 or larger. At locations in the two-dimensional data 33 that strongly exhibit characteristics of the first pattern and the second pattern, entries having evaluation values of "60" or larger are arranged consecutively. Accordingly, in a series of first evaluation values H1, when a predetermined or larger number of first evaluation values H1 each reaching a predetermined threshold are arranged consecutively, the determining unit 25 determines that the "first condition" is satisfied. Similarly, in a series of second evaluation values H2, when a predetermined or larger number of second evaluation values H2 each reaching a predetermined threshold are arranged consecutively, the determining unit 25 determines that the "second condition" is satisfied.

Next, an operation of the input device according to the present embodiment will be described with reference to flowcharts in FIGS. 11 and 12.

Figure 11:
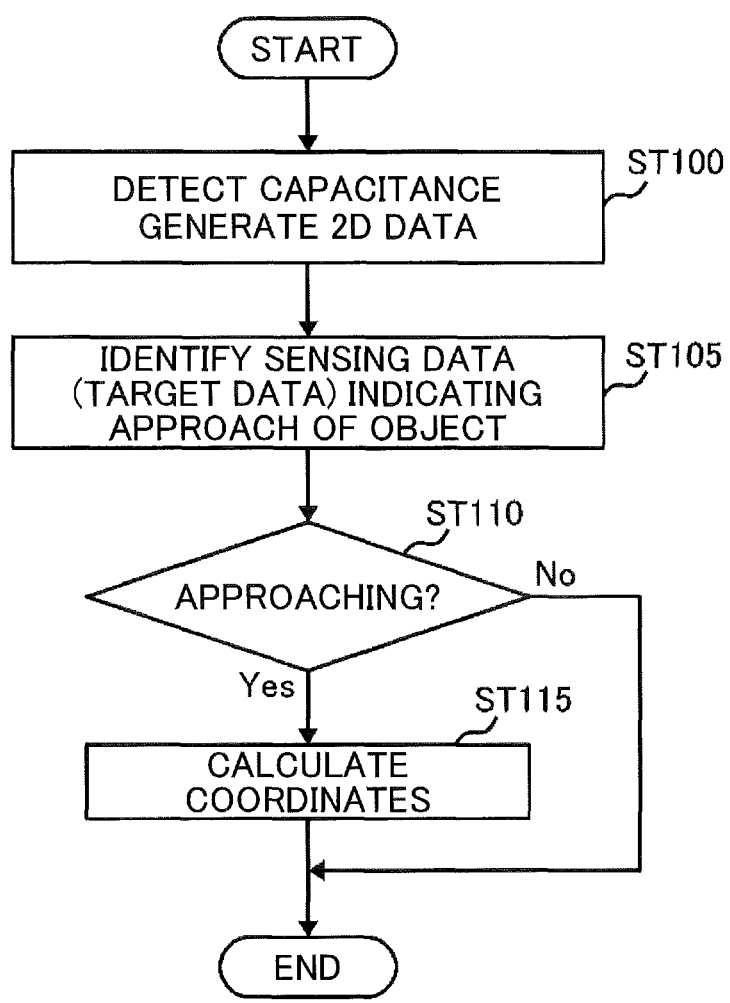
FIG. 11 is a flowchart illustrating an example of an operation for generating the two-dimensional data matrix and identifying target data.

FIG. 11 is a flowchart illustrating an example of an operation for generating the two-dimensional data 33 and specifying target data. The processor 20 of the input device repeatedly executes the process illustrated in FIG. 11 in a predetermined period.

The sensor control unit 21 controls the driver 13 and the capacitance detector 14 of the sensor unit 10 to detect capacitance values S of the capacitive coupling parts 12 formed in the electrostatic capacitive sensor 11. The two-dimensional data generating unit 22 computes, for each of the capacitive coupling parts 12 in the electrostatic capacitive sensor 11, a sensing data value D representing a difference (B−S) between the detected capacitance value S and a reference value B of capacitance, and generates the two-dimensional data matrix 33 consisting of the sensing data values D of all capacitive coupling parts 12 (ST100).

The identifying unit 24 identifies, as target data, a sensing data value D indicating that an object is in proximity to the capacitive coupling part 12 from the generated two-dimensional data 33 (ST105).

If the target data indicating approach of an object is identified by the identifying unit 24 (ST110:Yes), the coordinate computing unit 26 computes coordinates of a position which an object approaches based on the identified target data (ST115).

Figure 12:
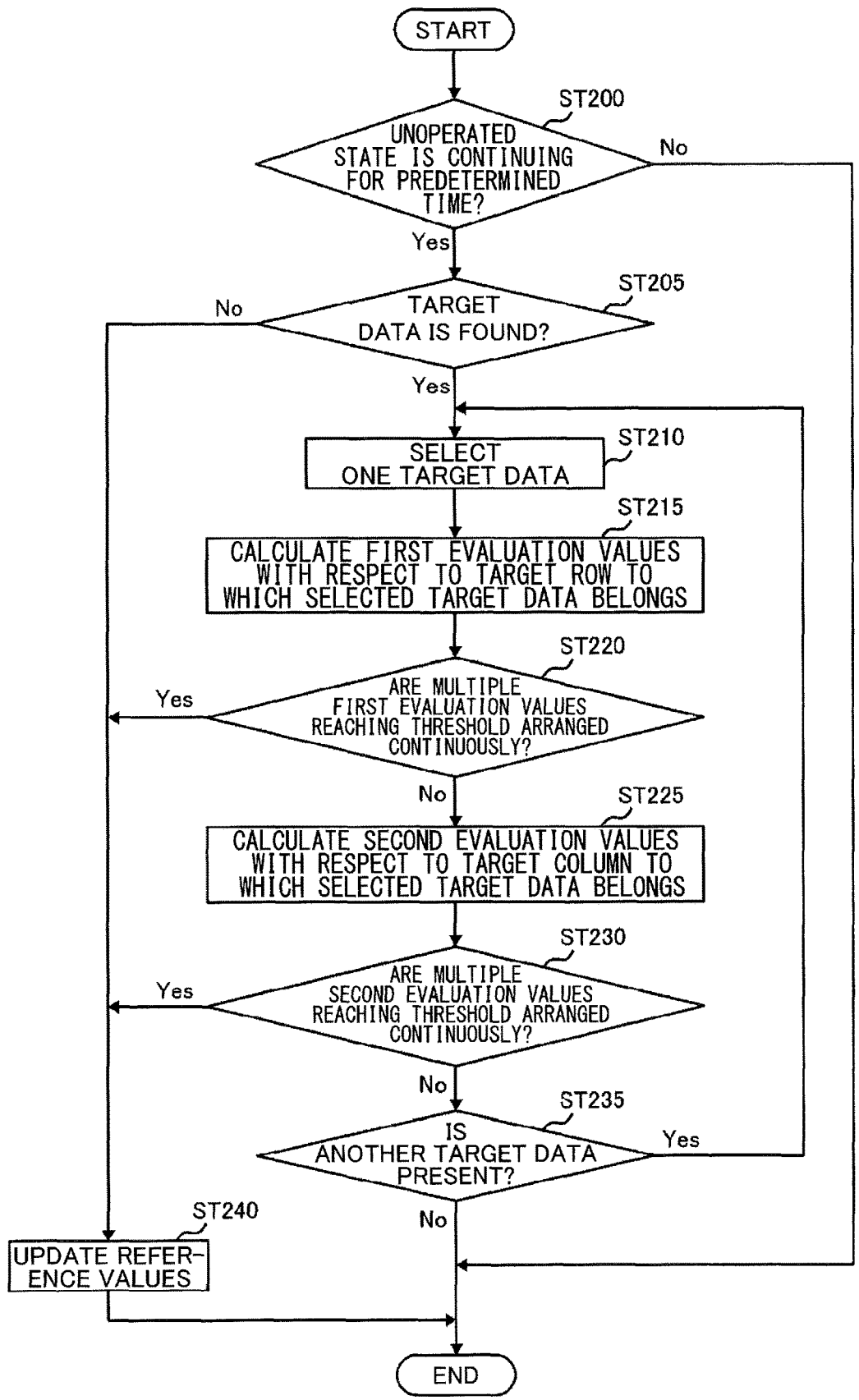
FIG. 12 is a flowchart illustrating an example of an operation for updating the reference values in the first embodiment.

FIG. 12 is a flowchart illustrating an example of an operation for updating reference values B. The processor 20 of the input device repeatedly executes the process illustrated in FIG. 12 at a predetermined timing.

The reference value updating unit 23 monitors occurrence of an unoperated state of the electrostatic capacitive sensor 11, based on the target data periodically identified by the identifying unit 24 or coordinates of a position which an object approaches which is computed by the coordinate computing unit 26. The unoperated state is, for example, a state in which an object is not in close proximity to the electrostatic capacitive sensor 11 or in which an object close to the electrostatic capacitive sensor 11 is not moving. The reference value updating unit 23 determines whether or not the unoperated state is continuing for a predetermined time or longer (ST200).

If the unoperated state has continued for the predetermined time or longer (ST200:Yes), the reference value updating unit 23 determines whether one or more target data (value) is identified by the identifying unit 24 (whether or not an object is in proximity to the electrostatic capacitive sensor 11) (ST205). If target data is not identified in the identifying unit 24 (when an object is not in proximity to the electrostatic capacitive sensor 11), the reference value updating unit 23 executes a process of updating the reference values B (ST240).

If one or more target data value is identified, the determining unit 25 selects one target data value from among the identified target data values (ST210), and calculates the first evaluation values H1 for all sensing data values D in a target row to which the selected target data belongs (ST215).

The determining unit 25 determines whether or not a predetermined or larger number of the first evaluation values H1 each reaching a predetermined threshold are arranged consecutively in a series of the first evaluation values H1 calculated for the target row (ST220). If a predetermined or larger number of the first evaluation values H1 each reaching the threshold are arranged consecutively (ST220:Yes), the target row satisfies the first condition. Thus, the reference value updating unit 23 executes the process of updating the reference values B (ST240).

If a predetermined or larger number of the first evaluation values H1 each reaching the threshold are not arranged consecutively in the series of the first evaluation values H1 (ST220:No), the determining unit 25 calculates the second evaluation values H2 for each sensing data value D in a target column to which the target data selected at the step ST210 belongs (ST225).

The determining unit 25 determines whether or not a predetermined or larger number of the second evaluation values H2 each reaching a predetermined threshold are arranged consecutively in a series of the second evaluation values H2 calculated for the target column (ST230). If a predetermined or larger number of the second evaluation values H2 each reaching the threshold are arranged consecutively (ST230:Yes), the target column satisfies the second condition. Thus, the reference value updating unit 23 executes the process of updating the reference values (ST240).

If a predetermined or larger number of the second evaluation values H2 each reaching the threshold are not arranged consecutively in the series of the second evaluation values H2 (ST230:No), and if there is another target data value (ST235:Yes), the determining unit 25 repeats the process of step ST210 and thereafter with respect to said another target data value. When the process of step ST210 to step ST230 is performed with respect to all the target data values identified by the identifying unit 24 (ST235:No), the determining unit 25 terminates the above-described decision processing for the current two-dimensional data 33.

As described above, according to the present embodiment, when a conductor with a weak capacitive coupling to a ground, such as a loop antenna in an IC card, is adjacent along a driving electrode Ed and a sensing electrode Es, capacitance of the capacitive coupling part 12 formed by the driving electrode Ed and the sensing electrode Es tends to increase. When the reference value B of the capacitive coupling part 12 is updated while the capacitance of the capacitive coupling part 12 is increased, and the conductor is removed from the electrostatic capacitive sensor 11 after the update of the reference value B, the capacitance of the capacitive coupling part 12 decreases relative to the updated reference value B. Because of this reduction in capacitance, a sensing data value D indicating that an object is in proximity is obtained from the capacitive coupling part 12. This sensing data value D is identified as target data. In addition, with respect to other capacitive coupling parts 12 formed in the sensing electrode Es or the driving electrode Ed, capacitance tends to decrease by the proximity of the conductor such as a loop antenna. If the reference values B of the other capacitive coupling parts 12 are updated during a state in which the capacitance of the other capacitive coupling parts 12 is decreased, and if the conductor is removed from the electrostatic capacitive sensor 11 after its update, the capacitance of the other capacitive coupling parts 12 increases relative to the updated reference values B. Accordingly, a target row selected on the basis of a row in the two-dimensional data 33 to which the target data belongs, or a target column selected on the basis of a column in the two-dimensional data 33 to which the target data belongs, tends to match the "first pattern" indicating that multiple capacitive coupling parts 12, each having capacitance greater than a reference value B of the corresponding capacitive coupling part 12, are arranged consecutively. If at least one of the target row and the target column matches the first pattern, the process of updating the reference values B is performed because abnormality of the reference value B may have occurred due to proximity of a conductor such as a loop antenna. Therefore, it is possible to determine presence or absence of an abnormality of the reference value B based on a pattern of the sensing data values D in the two-dimensional data 33, without using the information of the capacitance value S before the reference value B is updated as in the conventional apparatus. Accordingly, even if a conductor such as a loop antenna was placed in proximity to the electrostatic capacitive sensor 11 before power-on, and if the conductor is removed after power-on, abnormality of the reference value B can be appropriately detected and can be resolved promptly.

Further, according to the present embodiment, when a linear conductor, such as a loop antenna in an IC card, is adjacent along a given driving electrode Ed and a given sensing electrode Es, with respect to the capacitive coupling parts 12 in a sensing electrode Es adjacent to the given sensing electrode Es and the capacitive coupling parts 12 in a driving electrode Ed adjacent to the given driving electrode Ed, a difference between the capacitance value S and the reference value B tends to be small. Accordingly, an adjacent row that is adjacent to a target row or an adjacent column that is adjacent to a target column tends to match the "second pattern" indicating that capacitive coupling parts 12 each having a capacitance value S approximating a corresponding reference value B are arranged consecutively. Accordingly, if the "first condition" is satisfied, in which a target row matches the first pattern and an adjacent row matches the second pattern, or if the "second condition" is satisfied, in which a target column matches the first pattern and an adjacent column matches the second pattern, it is more likely that abnormality of the reference value B has occurred due to proximity of a conductor such as a loop antenna. Accordingly, by updating the reference values B in a case in which the "first condition" or "second condition" is satisfied, abnormality of the reference value B can be resolved more appropriately.

Further, according to the present embodiment, whether or not the "first condition" is satisfied is determined based on whether or not a predetermined or larger number of first evaluation values H1 each reaching a predetermined threshold are arranged consecutively in a series of first evaluation values H1 calculated for a target row. Also, whether or not the "second condition" is satisfied is determined based on whether or not a predetermined or larger number of second evaluation values H2 each reaching a predetermined threshold are arranged consecutively in a series of second evaluation values H2 calculated for a target column. Accordingly, in determining if a target row or a target column matches a certain pattern or not, because relevance to the first pattern or the second pattern can be determined based on a single evaluation value (H1 or H2), arithmetic operations regarding the determination can be simplified.

Second Embodiment

Next, a second embodiment of the present invention will be described. An input device according to the second embodiment is made by modifying the above-described process of the determining unit 25 in the input device according to the first embodiment, and the other configurations of the input device according to the second embodiment are the same as those of the input device according to the first embodiment. Hereinafter, the difference from the input device according to the first embodiment will be mainly explained.

In the input device according to the second embodiment, when determining relevance to the first pattern and the second pattern with respect to a target row and an adjacent row, the determining unit 25 calculates a single first evaluation value set for each sensing data value D in the target row. This first evaluation value set includes the target row evaluation value H11 (Equation (2)) and the adjacent row evaluation value H12 (Equation (3)) which are described above. That is, the determining unit 25 independently calculates the target row evaluation value H11 and the adjacent row evaluation value H12, rather than adding the target row evaluation value H11 and the adjacent row evaluation value H12 together to calculate the first evaluation value H1 (Equation (1)).

The determining unit 25 specifies first evaluation value set(s) each including the target row evaluation value H11 reaching a predetermined threshold and the adjacent row evaluation value H12 reaching a predetermined threshold, from among a series of the first evaluation value sets (the target row evaluation value H11 and the adjacent row evaluation value H12) calculated for all sensing data values D in a target row, identifies a sequence of the specified first evaluation value sets arranged consecutively in the target row, and counts the number of the first evaluation value sets in the sequence. The target row evaluation value H11 reaching the predetermined threshold is, for example, a target row evaluation value H11 of Equation (2) that is greater than a predetermined positive threshold when "$\alpha<0$" and "$\beta<0$" are set in Equation (2). Also, the adjacent row evaluation value H12 reaching the predetermined threshold is, for example, an adjacent row evaluation value H12 of Equation (3) that is less than a predetermined positive threshold when "$\gamma=1$" is set in Equation (3). In a case in which a predetermined or larger number of first evaluation value sets each including such a target row evaluation value H11 and an adjacent row evaluation value H12 are arranged consecutively, the determining unit 25 determines that the "first condition" is satisfied.

When determining relevance to the first pattern and the second pattern with respect to a target column and an adjacent column, the determining unit 25 calculates a single second evaluation value set for each sensing data value D in the target column. This second evaluation value set includes the target column evaluation value H21 (Equation (5)) and the adjacent column evaluation value H22 (Equation (6)) which are described above. That is, the determining unit 25 independently calculates the target column evaluation value H21 and the adjacent column evaluation value H22, rather than adding the target column evaluation value H21 and the adjacent column evaluation value H22 together to calculate the second evaluation value H2 (Equation (4)).

The determining unit 25 specifies second evaluation value set(s) each including the target column evaluation value H21 reaching a predetermined threshold and the adjacent column evaluation value H22 reaching a predetermined threshold, from among a series of the second evaluation value sets (the target column evaluation value H21 and the adjacent column evaluation value H22) calculated for all sensing data values D in a target column, and counts the number of the specified second evaluation value sets arranged consecutively in the series of the second evaluation value sets. The target column evaluation value H21 reaching the predetermined threshold is, for example, a target column evaluation value H21 of Equation (5) that is greater than a predetermined positive threshold when "$\nu<0$" and "$\eta<0$" are set in Equation (5). The adjacent column evaluation value H22 reaching the predetermined threshold is, for example, the adjacent column evaluation value H22 of Equation (6) that is less than a predetermined positive threshold when "$\kappa=1$" is set in Equation (6). When a predetermined or larger number of second evaluation value sets each including such a target column evaluation value H21 and an adjacent column evaluation value H22 are arranged consecutively, the determining unit 25 determines that the "second condition" is satisfied.

Figure 13A:
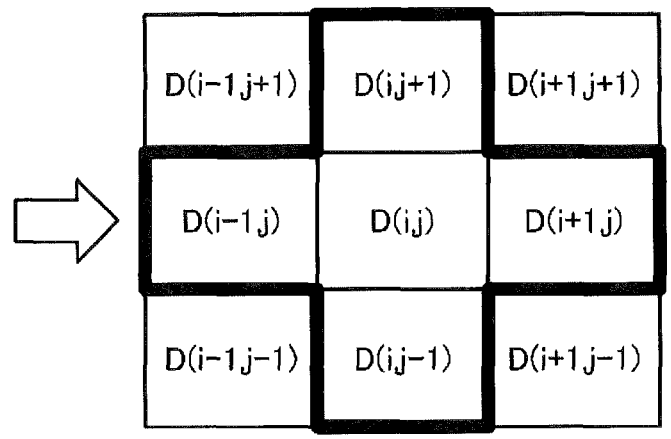
FIG. 13A is a diagram illustrating a method for calculating a first evaluation value set used for determination performed in a second embodiment, which illustrates a sensing data value in a target row and its surrounding sensing data values.
Figure 13B:
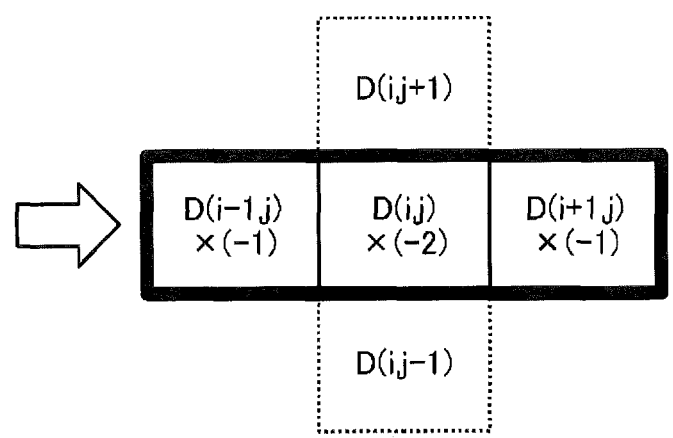
FIG. 13B is a diagram illustrating the method for calculating the first evaluation value set used for the determination performed in the second embodiment, which illustrates details of calculation applied to the respective sensing data values used for calculating a target row evaluation value.
Figure 13C:
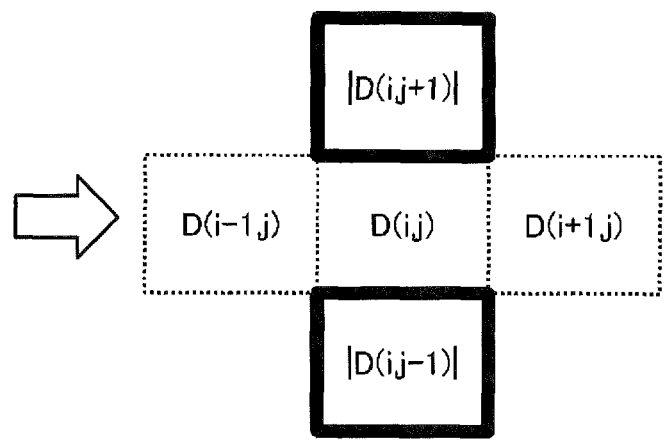
FIG. 13C is a diagram illustrating the method for calculating the first evaluation value set used for the determination performed in the second embodiment, which illustrates details of calculation applied to the respective sensing data values used for calculating an adjacent row evaluation value.

FIGS. 13A to 13C are diagrams for explaining a method for calculating the first evaluation value set (target row evaluation value H11 and adjacent row evaluation value H12) which is used for determination of a row. FIG. 13A illustrates one sensing data value $D(i,j)$ in a target row indicated by an arrow and its surrounding sensing data values D. FIG. 13B illustrates details of arithmetic operations applied to these sensing data values D when the target row evaluation value H11 is calculated, and FIG. 13C illustrates details of arithmetic operations applied to these sensing data values D when the adjacent row evaluation value H12 is calculated. As illustrated in FIG. 13B, the determining unit 25 multiplies the sensing data values $D(i-1,j)$, $D(i,j)$, and $D(i+1,j)$ arranged consecutively in the target row by "$-1$", "$-2$", and "$-1$", as weighting factors respectively, and adds the calculation results together to calculate the target row evaluation value H11. Also, the determining unit 25 calculates the adjacent row evaluation value H12 by converting the sensing data values $D(i,j-1)$ and $D(i,j+1)$, adjacent to the sensing data value $D(i,j)$ in the column direction, into absolute values, and by adding these absolute values together.

Figure 14A:
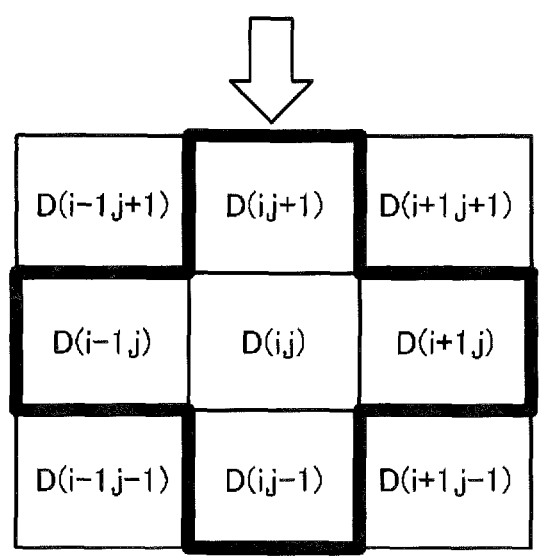
FIG. 14A is a diagram illustrating a method for calculating a second evaluation value set used for the determination performed in the second embodiment, which illustrates the sensing data value in the target row and its surrounding sensing data values.
Figure 14B:
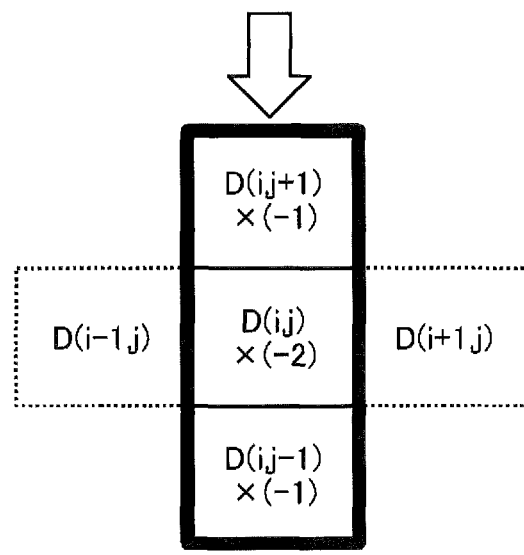
FIG. 14B is a diagram illustrating the method for calculating the second evaluation value set used for the determination performed in the second embodiment, which illustrates details of calculation applied to the respective sensing data values used for calculating a target column evaluation value.
Figure 14C:
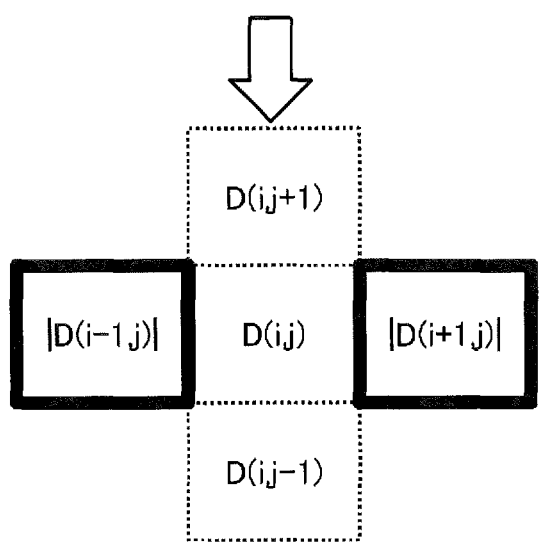
FIG. 14C is a diagram illustrating the method for calculating the second evaluation value set used for the determination performed in the second embodiment, which illustrates details of calculation applied to the respective sensing data values used for calculating an adjacent column evaluation value.

FIGS. 14A to 14C are diagrams for explaining a calculation method of the second evaluation value set (target column evaluation value H21 and adjacent column evaluation value H22) which is used for determination of a column. FIG. 14A illustrates one sensing data value $D(i,j)$ in a target column indicated by an arrow and its surrounding sensing data values D. FIG. 14B illustrates details of arithmetic operations applied to these sensing data values D when the target column evaluation value H21 is calculated, and FIG. 14C illustrates details of arithmetic operations applied to these sensing data values D when the adjacent column evaluation value H22 is calculated. As illustrated in FIG. 14B, the determining unit 25 multiplies the sensing data values $D(i,j-1)$, $D(i,j)$, and $D(i,j+1)$ arranged consecutively in the target column by "$-1$", "$-2$", and "$-1$" as weighting factors respectively, and adds the calculation results to calculate the target column evaluation value H21. Also, the determining unit 25 calculates the adjacent column evaluation value H22 by converting the sensing data values $D(i-1,j)$ and $D(i+1,j)$, adjacent to the sensing data value $D(i,j)$ in the row direction, into the absolute values, and by adding these absolute values together.

Figure 15:
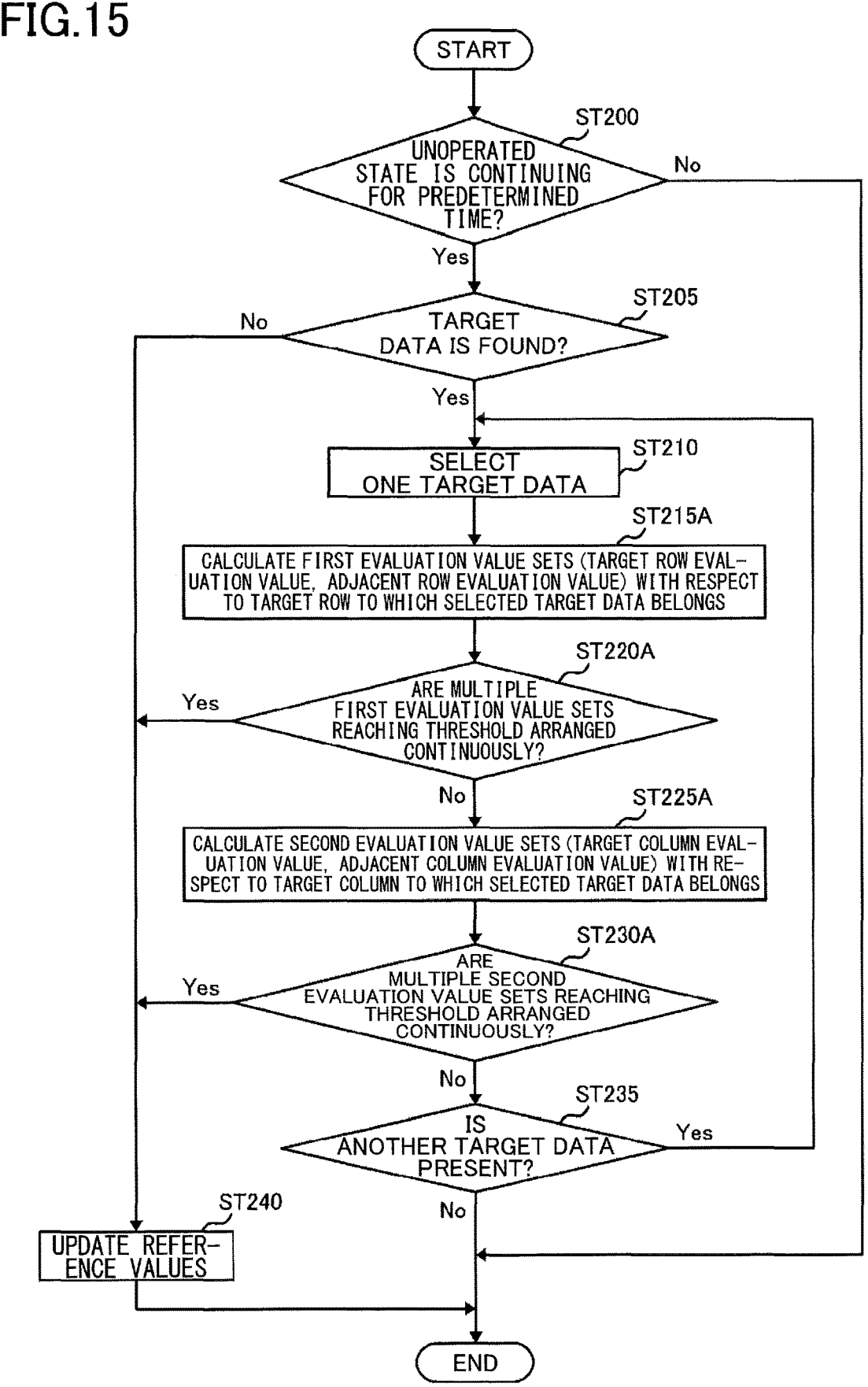
FIG. 15 is a flowchart illustrating an example of an operation for updating the reference values in the second embodiment.

FIG. 15 is a flowchart illustrating an example of an operation for updating the reference values B in the second embodiment. The flowchart illustrated in FIG. 15 is made by replacing steps ST215 to ST230 in the flowchart illustrated in FIG. 12 with steps ST215A to ST230A, and the other steps in the flowchart illustrated in FIG. 15 are the same as the flowchart illustrated in FIG. 12. Hereinafter, only the differences from the flowchart illustrated in FIG. 12 will be described.

When one target data (value) is selected at step ST210, the determining unit 25 calculates the first evaluation value sets (target row evaluation value H11 and adjacent row evaluation value H12) for all sensing data values D in a target row to which the selected target data belongs (ST215A). The determining unit 25 identifies first evaluation value set(s) each including a target row evaluation value H11 reaching a predetermined threshold and an adjacent row evaluation value H12 reaching a predetermined threshold, from among a series of the first evaluation value sets calculated at step ST215A, and determines whether or not a predetermined or larger number of the identified first evaluation value sets are arranged consecutively in the series of the first evaluation value sets (ST220A). If a predetermined or larger number of the identified first evaluation value sets are arranged consecutively (ST220A:Yes), the reference value updating unit 23 executes the process of updating the reference values B (ST240).

If a predetermined or larger number of the first evaluation value sets, each including the target row evaluation value (H11) reaching the predetermined threshold and the adjacent row evaluation value (H12) reaching the predetermined threshold, are not arranged consecutively in the series of the first evaluation value sets (ST220A:No), the determining unit 25 calculates the second evaluation value sets (target column evaluation value H21 and adjacent column evaluation value H22) for all sensing data values D in a target column to which the target data selected at step ST210 belongs. The determining unit 25 identifies second evaluation value set(s) each including the target column evaluation value H21 reaching a predetermined threshold and the adjacent column evaluation value H22 reaching a predetermined threshold, from among a series of the second evaluation value sets calculated at step ST225A, and determines whether or not a predetermined or larger number of the identified second evaluation value sets are arranged consecutively in the series of the second evaluation value sets (ST230A). If a predetermined or larger number of the identified second evaluation value sets are arranged consecutively (ST230A:Yes), the reference value updating unit 23 executes the process of updating the reference values B (ST240).

If a predetermined or larger number of the second evaluation value sets, each including the target column evaluation value (H21) reaching a predetermined threshold and the adjacent column evaluation value (H22) reaching a predetermined threshold, are not arranged consecutively in the series of the second evaluation value sets (ST230A:No), and if there is another target data value (ST235:Yes), the determining unit 25 repeats the process of step ST210 and thereafter with respect to said another target data value.

As described above, according to the present embodiment, whether or not the "first condition" is satisfied is determined based on whether or not a predetermined or larger number of first evaluation value sets, each including a target row evaluation value H11 reaching a predetermined threshold and an adjacent row evaluation value H12 reaching a predetermined threshold, are arranged consecutively in a series of first evaluation value sets calculated with respect to a target row and an adjacent row. In addition, whether or not the "second condition" is satisfied is determined based on whether or not a predetermined or larger number of second evaluation value sets, each including a target column evaluation value H21 reaching a predetermined threshold and an adjacent column evaluation value H22 reaching a predetermined threshold, are arranged consecutively in a series of second evaluation value sets calculated with respect to a target column and adjacent columns. Accordingly, a determination as to whether or not a target row or a target column matches the first pattern, and a determination as to whether or not an adjacent row or an adjacent column matches the second pattern, can be accurately performed each based on independent evaluation values.

Third Embodiment

Next, a third embodiment of the present invention will be described. An input device according to the third embodiment is made by modifying the above-described process of the determining unit 25 in the input device according to the first embodiment, and the other configurations of the input device according to the third embodiment are the same as those of the input device according to the first embodiment. Hereinafter, the difference from the input device according to the first embodiment will be mainly explained.

In the input device according to the third embodiment, when determining relevance to the first pattern with respect to a target row, the determining unit 25 calculates a single target row evaluation value H11 (Equation (2)) for each sensing data value D in the target row. That is, the determining unit 25 in the present embodiment does not add a target row evaluation value H11 and an adjacent row evaluation value H12 to calculate the first evaluation value H1 (Equation (1)), but rather calculates the target row evaluation value H11 that is simpler than the first evaluation value H1.

The determining unit 25 determines whether or not a predetermined or larger number of target row evaluation values H11 each reaching a predetermined threshold are arranged consecutively, in a series of target row evaluation values H11 calculated for a target row. The target row evaluation value H11 reaching the predetermined threshold is, for example, a target row evaluation value H11 of Equation (2) that is greater than a predetermined positive threshold when "α<0" and "β<0" are set in Equation (2). In a case in which a predetermined or larger number of target row evaluation values H11 each reaching the predetermined threshold are arranged consecutively, the determining unit 25 determines that the target row matches the first pattern.

When determining relevance to the second pattern with respect to a target column, the determining unit 25 calculates a single target column evaluation value H21 (Equation (5)) for each sensing data value D in the target column. That is, the determining unit 25 in the present embodiment does not add the target column evaluation value H21 and the adjacent column evaluation value H22 together to calculate the second evaluation value H2 (Equation (4)), but rather calculates the target column evaluation value H21 which is simpler than the second evaluation value H2.

The determining unit 25 determines whether or not a predetermined or larger number of target column evaluation values H21 each reaching a predetermined threshold are arranged consecutively, in a series of target column evaluation values H21 calculated for a target column. The target column evaluation value H21 reaching the predetermined threshold is, for example, a target column evaluation value H21 of Equation (5) that is greater than a predetermined positive threshold when "ν<0" and "η<0" are set in Equation (5). In a case in which a predetermined or larger number of target column evaluation values H21 each reaching a predetermined threshold are arranged consecutively, the determining unit 25 determines that the target column matches the first pattern.

Figure 16:
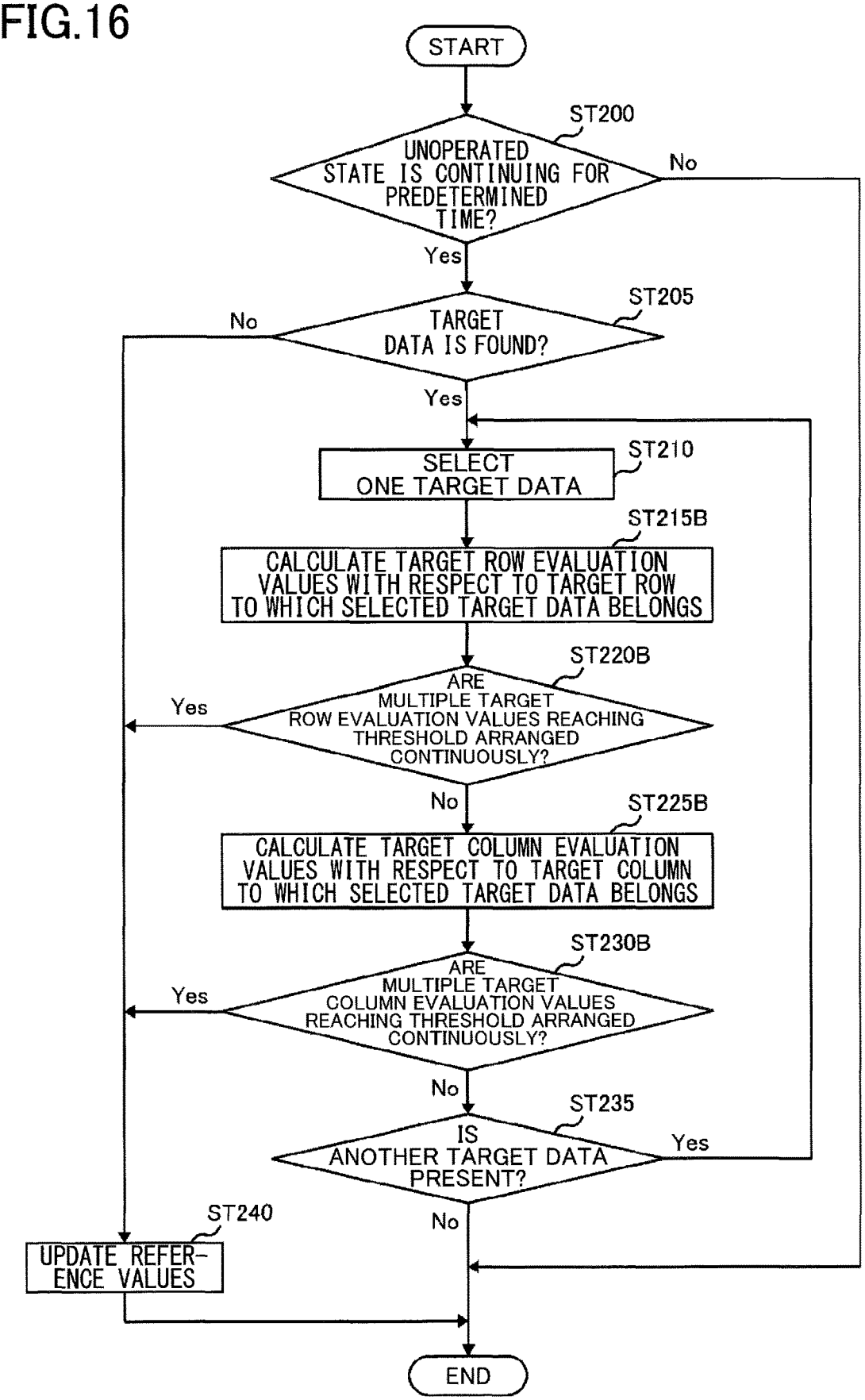
FIG. 16 is a diagram illustrating an example of an operation for updating the reference values in a third embodiment.

FIG. 16 is a flowchart illustrating an example of an operation for updating the reference values B in the third embodiment. The flowchart illustrated in FIG. 16 is made by replacing steps ST215 to ST230 in the flowchart illustrated in FIG. 12 with steps ST215B to ST230B, and the other steps in the flowchart illustrated in FIG. 16 are the same as the flowchart illustrated in FIG. 12. Hereinafter, only the differences from the flowchart illustrated in FIG. 12 will be described.

When one target data (value) is selected at step ST210, the determining unit 25 calculates the target row evaluation values H11 for all sensing data values D in a target row to which the selected target data belongs (ST215B). The determining unit 25 determines whether or not a predetermined or larger number of the target row evaluation values H11 each reaching a predetermined threshold are arranged consecutively in a series of the target row evaluation values H11 calculated at step ST215B (ST220B). If a predetermined or larger number of the target row evaluation values H11 each reaching the predetermined threshold are arranged consecutively (ST220B:Yes), the reference value updating unit 23 executes the process of updating the reference values B (ST240).

If a predetermined or larger number of the target row evaluation values H11 each reaching the predetermined threshold are not arranged consecutively in the series of the target row evaluation values H11 (ST220B:No), the determining unit 25 calculates the target column evaluation value H21 for each sensing data value D in a target column to which the target data selected at step ST210 belongs (ST225B). The determining unit 25 determines whether or not a predetermined or larger number of the target column evaluation values H21 each reaching a predetermined threshold are arranged consecutively in the series of the target column evaluation values H21 calculated at step ST225B (ST230B). If a predetermined or larger number of the target column evaluation values H21 each reaching the predetermined threshold are arranged consecutively, the reference value updating unit 23 executes the process of updating the reference values B (ST240).

If a predetermined or larger number of the target column evaluation values H21 each reaching the predetermined threshold are not arranged consecutively in the series of the target column evaluation values H21 (ST230B:No), and if there is another target data value (ST235:Yes), the determining unit 25 repeats the process step ST210 and thereafter with respect to said another target data value.

As described above, according to the present embodiment, whether or not a target row matches the first pattern is determined based on whether or not a predetermined or larger number of target row evaluation values H11 each reaching a predetermined threshold are arranged consecutively in a series of target row evaluation values H11 calculated with respect to the target row. In addition, whether or not a target column matches the first pattern is determined based on whether or not a predetermined or larger number of target column evaluation values H21 each reaching a predetermined threshold are arranged consecutively in a series of target column evaluation values H21 calculated with respect to the target column. Accordingly, by a simple operation, whether or not the target row or the target matches the first pattern can be determined.

Fourth Embodiment

Next, a fourth embodiment of the present invention will be described. The input device according to the fourth embodiment is made by modifying the method of selecting a target row and a target column performed by the determining unit 25 of the input device according to the first to third embodiments described above, and the other configurations are the same as the input device according to the first to third embodiments. Hereinafter, the difference from the input device according to the above-described embodiments will be described.

The determining unit 25 in each of the above-described embodiments selects a row to which target data belongs as a target row, and selects a column to which the target data belongs as a target column. Meanwhile, the determining unit 25 in the present embodiment selects a target row from among a row to which the target data belongs and rows adjacent to the row to which the target data belongs, and selects a target column from among a column to which the target data belongs and columns adjacent to the column to which the target data belongs.

That is, when determining relevance to the first pattern with respect to a target row, the determining unit 25 selects, for each column, a sensing data value D indicating that a capacitance value S is relatively large from among a row of the two-dimensional data 33 to which target data belongs and rows adjacent to the row to which the target data belongs, determines that a series of the selected sensing data values D is a target row, and determines whether or not the determined target row matches the first pattern.

When determining relevance to the first pattern with respect to a target column, the determining unit 25 selects, for each row, a sensing data value D indicating that a capacitance value S is relatively large from among a column of the two-dimensional data 33 to which the target data belongs and columns adjacent to the column of the two-dimensional data 33 to which the target data belongs, determines that a series of the selected sensing data values D is a target column, and determines whether or not the determined target column matches the first pattern.

FIG. 17 is a diagram illustrating a method of selecting (determining) a target row in the fourth embodiment. In FIG. 17, the sensing data value D(1, 12) enclosed in a thick square is target data, and a series of sensing data values D each enclosed in a circle represents a target row. The determining unit 25 selects each sensing data value D belonging to the target row, from a range consisting of the row Y12 to which the sensing data value D(1, 12) belongs and the rows Y11 and Y13 adjacent to the row Y12. That is, the determining unit 25 selects, for each column, a sensing data value D having the lowest value (the sensing data value D having a relatively large capacitance value S) in the range of the rows Y11 to Y13, as the sensing data value D in the target row. For example, in a range of the rows Y11 to Y13, the sensing data values at the column X4 (sensing data values D(4,11), D(4,12), and D(4,13)) are "−14", "−1", and "−12", respectively. The determining unit 25 selects the sensing data value D(4, 11) having the smallest value as a sensing data value in the target row.

In a case in which a linear conductor, such as a loop antenna in an IC card, is adjacent to a sensing electrode Es and its adjacent sensing electrode Es (such as a case in which the linear conductor is adjacent to the sensing electrode Es with a slight inclination relative to the sensing electrode Es), not only the row to which the target data belongs but also the row adjacent to the sensing electrode tend to exhibit the first pattern indicating that the capacitive coupling parts 12 each having a capacitance value S greater than a reference value B are arranged consecutively. Even in such a case, according to the present embodiment, by selecting, for each column, a sensing data value D indicating that a capacitance value S is relatively large, from among a row to which the target data belongs and rows adjacent to the row to which the target data belongs, a series of the selected sensing data values D is likely to match the first pattern. Accordingly, by determining relevance to the first pattern by using the series of the sensing data values D as the target row, abnormality of the reference value B due to proximity of a linear conductor can be appropriately determined (detected). Further, according to the present embodiment, because the target column is also selected from among a column and adjacent columns similarly to the target row, abnormality of the reference value B can be appropriately determined (detected) when a linear conductor is adjacent to a certain driving electrode Ed and its adjacent driving electrodes Ed.

(Summary)

A first aspect of the present invention relates to an input device for inputting information corresponding to a change in capacitance in accordance with proximity of an object. The input device includes a sensor unit including multiple driving electrodes to which drive voltage is applied and multiple sensing electrodes, the sensor unit being configured to form multiple capacitive coupling parts between the sensing electrodes and the driving electrodes;

a capacitance detector configured to detect a capacitance value of each of the capacitive coupling parts formed between the sensing electrodes and the driving electrodes;

a two-dimensional data generating unit configured to calculate each sensing data value of the capacitive coupling parts, the sensing data value of a corresponding capacitive coupling part of the capacitive coupling parts indicating a difference between the capacitance value of the corresponding capacitive coupling part detected by the capacitance detector and a reference value defined for the corresponding capacitive coupling part, and generate a two-dimensional data matrix having multiple rows each corresponding to a sensing electrode of the multiple sensing electrodes and having multiple columns each corresponding to a driving electrode of the multiple driving electrodes, each of the rows and each of the columns including multiple entries each corresponding to a capacitive coupling part of the multiple capacitive coupling parts, the sensing data value of each of the capacitive coupling parts being stored into an entry of the multiple entries such that an arrangement of the sensing data value in the two-dimensional data matrix corresponds to an arrangement of the corresponding capacitive coupling part on the sensor unit;

a reference value updating unit configured to update the reference value of each of the capacitive coupling parts, based on the capacitance value of the corresponding capacitive coupling part detected by the capacitance detector;

an identifying unit configured to identify, as target data, a sensing data value indicating that the object is in proximity to the corresponding capacitive coupling part, from the two-dimensional data matrix generated by the two-dimensional data generating unit; and a determining unit configured to determine whether or not at least one of a target row, selected based on the row in the two-dimensional data matrix to which the target data belongs, and a target column, selected based on the column in the two-dimensional data to which the target data belongs, matches a first pattern indicating that multiple capacitive coupling parts each having a capacitance value greater than a reference value are arranged consecutively.

The reference value updating unit updates the reference value of each of the capacitive coupling parts if it is determined that at least one or both of the target row and the target column matches the first pattern.

According to this configuration, when a conductor with a weak capacitive coupling to a ground, such as a loop antenna in an IC card, is adjacent along a driving electrode and a sensing electrode, capacitance of the capacitive coupling part formed by the driving electrode and the sensing electrode tends to increase. When the reference value of the capacitive coupling part is updated while the capacitance of the capacitive coupling part is increased, and the conductor is removed after the update, the capacitance of the capacitive coupling part decreases relative to the updated reference value. Because of this capacitance reduction, a sensing data value indicating that an object is in proximity is obtained from the capacitive coupling part. This sensing data value is identified as target data.

In addition, with respect to other capacitive coupling parts formed in the sensing electrode or the driving electrode, capacitance tends to decrease by the proximity of the conductor. If the reference values of the other capacitive coupling parts are updated during a state in which the capacitance of the other capacitive coupling parts is decreased, and if the conductor is removed after its update, the capacitance of the other capacitive coupling parts increases relative to the updated reference values. Accordingly, the target row selected based on the row in the two-dimensional data matrix to which the target data belongs, or the target column selected based on the column in the two-dimensional data matrix to which the target data belongs, tends to match the "first pattern" indicating that multiple capacitive coupling parts each having the capacitance value greater than the reference value are arranged consecutively.

If at least one or both of the target row and the target column matches the first pattern, the update of the reference value is performed because abnormality of the reference value may have occurred due to proximity of the conductor. This eliminates abnormality of the reference value.

Preferably, when determining relevance to the first pattern with respect to the target row, the determining unit may determine whether or not at least one of rows adjacent to the target row matches a second pattern indicating that the capacitive coupling parts each having the capacitance value approximating the reference value are arranged consecutively. Also, when determining relevance to the first pattern with respect to the target column, the determining unit may determine whether or not at least one of columns adjacent to the target column matches the second pattern. The reference value updating unit may update the reference value when a first condition, in which the target row matches the first pattern and the adjacent row matches the second pattern, or a second condition, in which the target column matches the first pattern and the adjacent column matches the second pattern, is satisfied. Alternatively, the reference value updating unit may update the reference value when both the first condition and the second condition are satisfied.

According to this configuration, when the conductor such as a loop antenna in an IC card is adjacent to a given driving electrode and a given sensing electrode, with respect to the capacitive coupling parts in a sensing electrode adjacent to the given sensing electrode and the capacitive coupling parts in a driving electrode adjacent to the given driving electrode, a difference between the capacitance value and the reference value tends to be small. Accordingly, an adjacent row that is adjacent to the target row or an adjacent column that is adjacent to the target column tend to match the second pattern indicating that capacitive coupling parts, each having the capacitance value approximating the reference value, are arranged consecutively. Accordingly, if the first condition, in which the target row matches the first pattern and the adjacent row matches the second pattern, or the second condition, in which the target column matches the first pattern and the adjacent column matches the second pattern, is satisfied, it is more likely that abnormality of the reference value has occurred due to proximity of the conductor. Accordingly, by updating the reference value in a case in which the "first condition" or "second condition" is satisfied, abnormality of the reference value can be resolved more appropriately.

Preferably, when determining relevance to the first pattern and the second pattern with respect to the target row and the adjacent row, the determining unit may calculate, for each of the sensing data values in the target row, a first evaluation value representing both a degree to which the capacitance value in the target row exceeds the reference value, and a degree of approximation of the capacitance value to the reference value in the adjacent row. The first evaluation value corresponding to a given sensing data value in the target row is calculated based on a series of sensing data values in the target row including the given sensing data value, and at least a sensing data value adjacent to the given sensing data value in a column direction. If, in a series of the first evaluation values calculated for the target row, multiple first evaluation values each reaching a threshold are arranged consecutively, the determining unit may determine that the first condition is satisfied.

Preferably, when determining relevance to the first pattern and the second pattern with respect to the target column and the adjacent column, the determining unit may calculate, for each of the sensing data values in the target column, a second evaluation value representing both a degree to which the capacitance value in the target column exceeds the reference value, and a degree of approximation of the capacitance value to the reference value in the adjacent column. The second evaluation value corresponding to a given sensing data value in the target column is calculated based on a series of sensing data values in the target column including the given sensing data value, and at least a sensing data value adjacent to the given sensing data value in a row direction. If, in a series of the second evaluation values calculated for the target column, multiple second evaluation values each reaching a threshold are arranged consecutively, the determining unit may determine that the second condition is satisfied.

According to this configuration, whether or not the first condition is satisfied is determined based on whether or not multiple first evaluation values each reaching the threshold are arranged consecutively in the series of the first evaluation values calculated for the target row. Therefore, the determination of relevance to the first pattern and the second pattern with respect to the target row and the adjacent row is simplified.

Further, according to this configuration, whether or not the second condition is satisfied is determined based on whether or not multiple second evaluation values each reaching the threshold are arranged consecutively in the series of the second evaluation values calculated for the target column. Therefore, the determination of relevance to the first pattern and the second pattern with respect to the target column and the adjacent column is simplified.

Preferably, when determining relevance to the first pattern and the second pattern with respect to the target row and the adjacent row, the determination unit calculates, for each of the sensing data values in the target row, a first evaluation value set including a target row evaluation value and an adjacent row evaluation value. The target row evaluation value in the first evaluation value set corresponding to a given sensing data value in the target row represents a degree to which the capacitance value in the target row exceeds the reference value, and is calculated based on a series of sensing data values in the target row including the given sensing data value. The adjacent row evaluation value in the first evaluation value corresponding to a given sensing data value in the target row represents a degree of approximation of the capacitance value to the reference value in the adjacent row, and is calculated based on at least a sensing data value adjacent to the given sensing data value in a column direction. If, in a series of the first evaluation value sets calculated for the target row, multiple first evaluation value sets each including the target row evaluation value reaching a threshold and the adjacent row evaluation value reaching a threshold are arranged consecutively, the determining unit may determine that the first condition is satisfied.

Preferably, when determining relevance to the first pattern and the second pattern with respect to the target column and the adjacent column, the determination unit calculates, for each of the sensing data values in the target column, a second evaluation value set including a target column evaluation value and an adjacent column evaluation value. The target column evaluation value in the second evaluation value set corresponding to a given sensing data value in the target column represents a degree to which the capacitance value in the target column exceeds the reference value, and is calculated based on a series of sensing data values in the target column including the given sensing data value. The adjacent column evaluation value in the second evaluation value set corresponding to a given sensing data value in the target column represents a degree of approximation of the capacitance value to the reference value in the adjacent column, and is calculated based on at least a sensing data value adjacent to the given sensing data value in a row direction. If, in a series of the second evaluation value sets calculated for the target column, multiple second evaluation value sets each including the target column evaluation value reaching a threshold and the adjacent column evaluation value reaching a threshold are arranged consecutively, the determining unit may determine that the second condition is satisfied.

According to this configuration, whether or not the first condition is satisfied is determined based on whether or not multiple first evaluation value sets each including the target row evaluation value reaching a threshold and the adjacent row evaluation value reaching a threshold are arranged consecutively in the series of the first evaluation value sets calculated with respect to the target row and the adjacent row. Accordingly, it becomes easier to accurately determine whether or not the target row matches the first pattern and whether or not the adjacent row matches the second pattern, based on independent evaluation values.

Further, according to this configuration, whether or not the second condition is satisfied is determined based on whether or not multiple second evaluation value sets each including the target column evaluation value reaching a threshold and the adjacent column evaluation value reaching a threshold are arranged consecutively in the series of the second evaluation value sets calculated with respect to the target column and the adjacent column. Accordingly, it becomes easier to accurately determine whether or not the target column matches the first pattern and whether or not the adjacent column matches the second pattern, based on independent evaluation values.

Preferably, when determining relevance to the first pattern with respect to the target row, the determination unit may calculate, for each of the sensing data values in the target row, a target row evaluation value representing a degree to which the capacitance value in the target row exceeds the reference value. The target row evaluation value corresponding to a given sensing data value in the target row is calculated based on a series of sensing data values in the target row including the given sensing data value.

If, in a series of the target row evaluation values calculated for the target row, multiple target row evaluation values each reaching a threshold are arranged consecutively, the determining unit may determine that the target row matches the first pattern.

Preferably, when determining relevance to the first pattern with respect to the target column, the determination unit may calculate, for each of the sensing data values in the target column, a target column evaluation value representing a degree to which the capacitance value of the target column exceeds the reference value. The target column evaluation value corresponding to a given sensing data value in the target column is calculated based on a series of sensing data values in the target column including the given sensing data value. If, in a series of the target column evaluation values calculated for the target column, multiple target column evaluation values each reaching a threshold are arranged consecutively, the determining unit may determine that the target column matches the first pattern.

According to this configuration, whether or not the target row matches the first pattern is determined based on whether or not multiple target row evaluation values each reaching a threshold are arranged consecutively in the series of the target row evaluation values calculated with respect to the target row.

Further, according to this configuration, whether or not the target column matches the first pattern is determined based on whether or not multiple target column evaluation values each reaching a threshold are arranged consecutively in the series of the target column evaluation values calculated with respect to the target column.

Preferably, when determining relevance to the first pattern with respect to the target row, the determining unit may select, for each column, a sensing data value indicating that the capacitance value is relatively large, from among a row in the two-dimensional data matrix to which target data belongs and rows adjacent to the row to which the target data belongs, may determine that a series of the selected sensing data values is a target row, and may perform determination as to whether or not the determined target row matches the first pattern.

Preferably, when determining relevance to the first pattern with respect to the target column, the determination unit may select, for each row, a sensing data value indicating that the capacitance value is relatively large, from among a column in the two-dimensional data matrix to which the target data belongs and columns adjacent to the column to which the target data belongs, may determine that a series of the selected sensing data values is a target column, and may perform determination as to whether or not the determined target column matches the first pattern.

When a conductor, such as a loop antenna in an IC card, is adjacent to a sensing electrode and a sensing electrode adjacent thereto, not only a row to which the target data belongs but also its adjacent row tend to exhibit the first pattern indicating that multiple capacitive coupling parts each having a capacitance value greater than a reference value are arranged consecutively. In such a case, by selecting, for each column, a sensing data value indicating that the capacitance value is relatively large, from among a row to which the target data belongs and rows adjacent thereto, a series of the selected sensing data values is likely to match the first pattern. Accordingly, by determining relevance to the first pattern by using the series of the selected sensing data values as the target row, abnormality of the reference value due to proximity of the conductor is appropriately determined.

Similarly, when the conductor is adjacent to a driving electrode and a driving electrode adjacent thereto, the first pattern, indicating that multiple capacitive coupling parts each having a capacitance value greater than a reference value are arranged, tends to appear in not only a column to which the target data belongs but also its adjacent column. In such a case, by selecting, for each row, a sensing data value indicating that the capacitance value is relatively large, from among a column to which the target data belongs and columns adjacent thereto, a series of the selected sensing data values is likely to match the first pattern. Accordingly, by determining relevance to the first pattern by using the series of selected sensing data values as the target column, abnormality of the reference value due to proximity of the conductor is appropriately determined.

A second aspect of the present invention relates to a method of controlling an input device for inputting information corresponding to a change in capacitance in accordance with proximity of an object. The input device includes a sensor unit including multiple driving electrodes to which drive voltage is applied and multiple sensing electrodes, the sensor unit being configured to form multiple capacitive coupling parts between the sensing electrodes and the driving electrodes; and a capacitance detector configured to detect a capacitance value of each of the capacitive coupling parts formed between the sensing electrodes and the driving electrodes. The method of controlling the input device includes calculating each sensing data value of the capacitive coupling parts, the sensing data value of a corresponding capacitive coupling part of the capacitive coupling parts indicating a difference between the capacitance value of the corresponding capacitive coupling part detected by the capacitance detector and a reference value defined for the corresponding capacitive coupling part;

generating a two-dimensional data matrix having multiple rows each corresponding to a sensing electrode of the multiple sensing electrodes and having multiple columns each corresponding to a driving electrode of the multiple driving electrodes, each of the rows and each of the columns including multiple entries each corresponding to a capacitive coupling part of the multiple capacitive coupling parts, the sensing data value of each of the capacitive coupling parts being stored into an entry of the multiple entries such that an arrangement of the sensing data value in the two-dimensional data matrix corresponds to an arrangement of the corresponding capacitive coupling part on the sensor unit;

updating the reference value of each of the capacitive coupling parts, based on the capacitance value of the corresponding capacitive coupling part detected by the capacitance detector;

identifying, as target data, a sensing data value indicating that the object is in proximity to the corresponding capacitive coupling part, from the two-dimensional data matrix generated by the two-dimensional data generating unit; and determining whether or not at least one of a target row, selected based on the row in the two-dimensional data matrix to which the target data belongs, and a target column, selected based on the column in the two-dimensional data to which the target data belongs, matches a first pattern indicating that multiple capacitive coupling parts each having a capacitance value greater than a reference value are arranged consecutively.

The updating of the reference value of each of the capacitive coupling parts is performed when it is determined that at least one or both of the target row and the target column matches the first pattern.

Preferably, when determining relevance to the first pattern with respect to the target row, determination as to whether or not at least one of rows adjacent to the target row matches a second pattern, indicating that the capacitive coupling parts each having the capacitance value approximating the reference value are arranged consecutively, may be performed. Also, when determining relevance to the first pattern with respect to the target column, determination as to whether or not at least one of columns adjacent to the target column matches the second pattern may be performed. The updating of the reference value of each of the capacitive coupling parts may be performed when a first condition, in which the target row matches the first pattern and the adjacent row matches the second pattern, or a second condition, in which the target column matches the first pattern and the adjacent column matches the second pattern, is satisfied. Alternatively, the updating of the reference value of each of the capacitive coupling parts may be performed when both the first condition and the second condition are satisfied.

A third aspect of the present invention relates to a program for causing a computer to execute the control method of an input device according to the second aspect.

According to the present invention, an input device, a method, and a program can be provided, in which abnormalities in a reference value due to proximity of a conductor such as a loop antenna along a driving electrode or a sensing electrode is appropriately eliminated.

While some embodiments of the present invention have been described above, the present invention is not limited to the embodiments described above, but may include various variations.

In the first to third embodiments described above, with respect to a certain target data value, if at least one of the "first condition" which is a condition with respect to the row direction and the "second condition" which is a condition with respect to the column direction is satisfied, the reference values are updated. However, in other embodiments of the present invention, the reference values may be updated if both the "first condition" and the "second condition" are satisfied.

The method for calculating the first evaluation value H1 (target row evaluation value H11 and adjacent row evaluation value H12) and the method for calculating the second evaluation value H2 (target column evaluation value H21 and adjacent column evaluation value H22) in each of the above-described embodiments are exemplary, and the present invention is not limited to these examples. A sensing data value and a weighting factor that are used to calculate each evaluation value may be suitably set depending on types of abnormal states of a reference value to be detected and the like.

The above-described input device may be implemented by a memory storing a program and a processor connected to the memory configured to execute the program stored in the memory.

What is claimed is:

1. An input device configured to input information corresponding to a change in capacitance in accordance with proximity of an object, the input device comprising:
   a sensor unit including a plurality of driving electrodes to which drive voltage is applied and a plurality of sensing electrodes, the sensor unit being configured to form a plurality of capacitive coupling parts between the sensing electrodes and the driving electrodes;
   a capacitance detector configured to detect a capacitance value of each of the capacitive coupling parts formed between the sensing electrodes and the driving electrodes;
   a two-dimensional data generating unit configured to
      calculate each sensing data value of the capacitive coupling parts, the sensing data value of a corresponding capacitive coupling part of the capacitive coupling parts indicating a difference between the capacitance value of the corresponding capacitive coupling part detected by the capacitance detector and a reference value defined for the corresponding capacitive coupling part, and
      generate a two-dimensional data matrix having a plurality of rows each corresponding to a sensing electrode of the plurality of sensing electrodes and having a plurality of columns each corresponding to a driving electrode of the plurality of driving electrodes, each of the rows and each of the columns including a plurality of entries each corresponding to a capacitive coupling part of the plurality of capacitive coupling parts, the sensing data value of each of the capacitive coupling parts being stored into an entry of the plurality of entries such that an arrangement of the sensing data value in the two-dimensional data matrix corresponds to an arrangement of the corresponding capacitive coupling part on the sensor unit;
   a reference value updating unit configured to update the reference value of each of the capacitive coupling parts, based on the capacitance value of the corresponding capacitive coupling part detected by the capacitance detector;
   an identifying unit configured to identify, as target data, a sensing data value indicating that the object is in proximity to the corresponding capacitive coupling part, from the two-dimensional data matrix generated by the two-dimensional data generating unit; and
   a determining unit configured to determine whether or not at least one or both of a target row and a target column matches a first pattern indicating that a plurality of capacitive coupling parts each having a capacitance value greater than a reference value are arranged consecutively, the target row being selected based on the row in the two-dimensional data matrix to which the target data belongs, and the target column being selected based on the column in the two-dimensional data to which the target data belongs; wherein
   the reference value updating unit is configured to update the reference value of each of the capacitive coupling parts in response to determination that at least one or both of the target row and the target column matches the first pattern.

2. The input device according to claim 1, wherein
   the determining unit is configured to
      determine whether or not at least one of rows adjacent to the target row matches a second pattern indicating that a plurality of capacitive coupling parts each having a capacitance value approximating a reference value are arranged consecutively, when determining relevance to the first pattern with respect to the target row, and
      determine whether or not at least one of columns adjacent to the target column matches the second pattern, when determining relevance to the first pattern with respect to the target column; and
   the reference value updating unit is configured to update the reference value in a case in which at least one or both of a first condition and a second condition is satisfied, the first condition being a condition in which the target row matches the first pattern and the adjacent row matches the second pattern, and the second condition being a condition in which the target column matches the first pattern and the adjacent column matches the second pattern.

3. The input device according to claim 2, wherein,
when determining relevance to the first pattern and the second pattern with respect to the target row and the adjacent row, the determining unit is configured to
calculate, for each of the sensing data values in the target row, a first evaluation value representing both a degree to which the capacitance value in the target row exceeds the reference value and a degree of approximation of the capacitance value to the reference value in the adjacent row, the first evaluation value corresponding to a given sensing data value in the target row being calculated based on a series of sensing data values in the target row including the given sensing data value, and based on at least a sensing data value adjacent to the given sensing data value in a column direction; and
determine that the first condition is satisfied, in a case in which a plurality of first evaluation values each reaching a threshold are arranged consecutively in a series of the first evaluation values calculated for the target row; and
when determining relevance to the first pattern and the second pattern with respect to the target column and the adjacent column, the determining unit is configured to
calculate, for each of the sensing data values in the target column, a second evaluation value representing both a degree to which the capacitance value in the target column exceeds the reference value, and a degree of approximation of the capacitance value to the reference value in the adjacent column, the second evaluation value corresponding to a given sensing data value in the target column being calculated based on a series of sensing data values in the target column including the given sensing data value, and based on at least a sensing data value adjacent to the given sensing data value in a row direction; and
determine that the second condition is satisfied, in a case in which a plurality of second evaluation values each reaching a threshold are arranged consecutively in a series of the second evaluation values calculated for the target column.

4. The input device according to claim 2, wherein,
when determining relevance to the first pattern and the second pattern with respect to the target row and the adjacent row, the determining unit is configured to
calculate, for each of the sensing data values in the target row, a first evaluation value set including a target row evaluation value and an adjacent row evaluation value,
the target row evaluation value in the first evaluation value set corresponding to a given sensing data value in the target row representing a degree to which the capacitance value in the target row exceeds the reference value, and being calculated based on a series of sensing data values in the target row including the given sensing data value, and
the adjacent row evaluation value in the first evaluation value corresponding to a given sensing data value in the target row representing a degree of approximation of the capacitance value to the reference value in the adjacent row, and being calculated based on at least a sensing data value adjacent to the given sensing data value in a column direction; and
determine that the first condition is satisfied, in a case in which a plurality of first evaluation value sets, each including the target row evaluation value reaching a threshold and the adjacent row evaluation value reaching a threshold, are arranged consecutively in a series of the first evaluation value sets calculated for the target row; and
when determining relevance to the first pattern and the second pattern with respect to the target column and the adjacent column, the determining unit is configured to
calculate, for each of the sensing data values in the target column, a second evaluation value set including a target column evaluation value and an adjacent column evaluation value,
the target column evaluation value in the second evaluation value set corresponding to a given sensing data value in the target column representing a degree to which the capacitance value in the target column exceeds the reference value, and being calculated based on a series of sensing data values in the target column including the given sensing data value, and
the adjacent column evaluation value in the second evaluation value set corresponding to a given sensing data value in the target column representing a degree of approximation of the capacitance value to the reference value in the adjacent column, and being calculated based on at least a sensing data value adjacent to the given sensing data value in a row direction; and
determine that the second condition is satisfied, in a case in which a plurality of second evaluation value sets, each including the target column evaluation value reaching a threshold and the adjacent column evaluation value reaching a threshold, are arranged consecutively in a series of the second evaluation value sets calculated for the target column.

5. The input device according to claim 1, wherein,
when determining relevance to the first pattern with respect to the target row, the determining unit is configured to
calculate, for each of the sensing data values in the target row, a target row evaluation value representing a degree to which a capacitance value in the target row exceeds a reference value, the target row evaluation value corresponding to a given sensing data value in the target row being calculated based on a series of sensing data values in the target row including the given sensing data value; and
determine that the target row matches the first pattern, in a case in which a plurality of target row evaluation values each reaching a threshold are arranged consecutively in a series of the target row evaluation values calculated for the target row; and
when determining relevance to the first pattern with respect to the target column, the determining unit is configured to
calculate, for each of the sensing data values in the target column, a target column evaluation value representing a degree to which the capacitance value of the target column exceeds the reference value, the target column evaluation value corresponding to a given sensing data value in the target column being calculated based on a series of sensing data values in the target column including the given sensing data value; and determine that the target column matches the first pattern, in a case in which a plurality of target column evaluation values each reaching a threshold are arranged consecutively in a series of the target column evaluation values calculated for the target column.

6. The input device according to claim 1, wherein,
when determining relevance to the first pattern with respect to the target row, the determining unit is configured to
select, for each column, a sensing data value indicating that a capacitance value is relatively large, from among a row in the two-dimensional data matrix to which target data belongs and rows adjacent to the row to which the target data belongs,
determine that a series of the selected sensing data values is a target row, and
perform determination as to whether or not the determined target row matches the first pattern; and
when determining relevance to the first pattern with respect to the target column, the determining unit is configured to
select, for each row, a sensing data value indicating that the capacitance value is relatively large, from among a column in the two-dimensional data matrix to which the target data belongs and columns adjacent to the column to which the target data belongs,
determine that a series of the selected sensing data values is a target column, and
perform determination as to whether or not the determined target column matches the first pattern.

7. A method of controlling an input device for inputting information corresponding to a change in capacitance in accordance with proximity of an object, the input device including
a sensor unit including a plurality of driving electrodes to which drive voltage is applied and a plurality of sensing electrodes, the sensor unit being configured to form a plurality of capacitive coupling parts between the sensing electrodes and the driving electrodes; and
a capacitance detector configured to detect a capacitance value of each of the capacitive coupling parts formed between the sensing electrodes and the driving electrodes;
the method comprising:
calculating each sensing data value of the capacitive coupling parts, the sensing data value of a corresponding capacitive coupling part of the capacitive coupling parts indicating a difference between the capacitance value of the corresponding capacitive coupling part detected by the capacitance detector and a reference value defined for the corresponding capacitive coupling part;
generating a two-dimensional data matrix having a plurality of rows each corresponding to a sensing electrode of the plurality of sensing electrodes and having a plurality of columns each corresponding to a driving electrode of the plurality of driving electrodes, each of the rows and each of the columns including a plurality of entries each corresponding to a capacitive coupling part of the plurality of capacitive coupling parts, the sensing data value of each of the capacitive coupling parts being stored into an entry of the plurality of entries such that an arrangement of the sensing data value in the two-dimensional data matrix corresponds to an arrangement of the corresponding capacitive coupling part on the sensor unit;
updating the reference value of each of the capacitive coupling parts, based on the capacitance value of the corresponding capacitive coupling part detected by the capacitance detector;
identifying, as target data, a sensing data value indicating that the object is in proximity to the corresponding capacitive coupling part, from the two-dimensional data matrix generated by the two-dimensional data generating unit; and
determining whether or not at least one of a target row, selected based on the row in the two-dimensional data matrix to which the target data belongs, and a target column, selected based on the column in the two-dimensional data to which the target data belongs, matches a first pattern indicating that a plurality of capacitive coupling parts each having a capacitance value greater than a reference value are arranged consecutively; wherein
the updating of the reference value of each of the capacitive coupling parts is performed in response to determination that at least one or both of the target row and the target column matches the first pattern.

8. The method according to claim 7, further comprising:
determining whether or not at least one of rows adjacent to the target row matches a second pattern indicating that a plurality of capacitive coupling parts each having a capacitance value approximating a reference value are arranged consecutively, when determining relevance to the first pattern with respect to the target row; and
determining whether or not at least one of columns adjacent to the target column matches the second pattern, when determining relevance to the first pattern with respect to the target column; wherein
the updating of the reference value of each of the capacitive coupling parts is performed in a case in which at least one or both of a first condition and a second condition is satisfied, the first condition being a condition in which the target row matches the first pattern and the adjacent row matches the second pattern, and the second condition being a condition in which the target column matches the first pattern and the adjacent column matches the second pattern.

* * * * *